United States Patent
Fukui et al.

(10) Patent No.: US 12,224,942 B2
(45) Date of Patent: Feb. 11, 2025

(54) NETWORK MANAGEMENT SYSTEMS, EDGE DEVICES, NETWORK MANAGEMENT DEVICES, AND PROGRAMS

(71) Applicant: NIPPON TELEGRAPH AND TELEPHONE CORPORATION, Tokyo (JP)

(72) Inventors: Tatsuya Fukui, Musashino (JP); Katsuya Minami, Musashino (JP); Yuki Sakaue, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 340 days.

(21) Appl. No.: 17/908,738

(22) PCT Filed: Mar. 5, 2020

(86) PCT No.: PCT/JP2020/009529
§ 371 (c)(1),
(2) Date: Sep. 1, 2022

(87) PCT Pub. No.: WO2021/176670
PCT Pub. Date: Sep. 10, 2021

(65) Prior Publication Data
US 2023/0120869 A1    Apr. 20, 2023

(51) Int. Cl.
*H04L 47/22* (2022.01)
*H04L 47/215* (2022.01)

(52) U.S. Cl.
CPC ............ *H04L 47/22* (2013.01); *H04L 47/215* (2013.01)

(58) Field of Classification Search
CPC ........ H04L 47/22; H04L 47/215; H04L 47/00
See application file for complete search history.

(56) References Cited

U.S. PATENT DOCUMENTS 8,000,244 B1 * 8/2011 Canion ............... H04L 47/2441
370/235
9,350,673 B2 * 5/2016 Kalkunte .............. H04L 45/123
(Continued)

FOREIGN PATENT DOCUMENTS

CN       112073334 A   * 12/2020   ............ H04L 47/21
CN       112737970 A   *  4/2021   ........... H04L 47/215
(Continued)

OTHER PUBLICATIONS

Cisco Router—show interfaces, as a network engineer, Jan. 6, 2020 (Reading Day), https://www.infraexpert.com/study/ciscorouter4.html.

(Continued)

*Primary Examiner* — Chi H Pham
*Assistant Examiner* — Vladislav Y Agureyev
(74) *Attorney, Agent, or Firm* — Harness, Dickey & Pierce, P.L.C.

(57) ABSTRACT

An object is to provide a network management system and the like capable of being introduced into an existing network to ascertain an instantaneous traffic variation in the network. The scheme of the present invention uses a shaping function included by each edge apparatus. The shaping function controls packet transmission in a millisecond order. The network management apparatus according to the present invention adds up the amount of transmitted packets for each control period reported by each edge apparatus and estimates this as an instantaneous traffic amount in the network. In the scheme, it is only necessary to add one network management apparatus to an existing network and to cause each edge apparatus to report the amount of transmitted packet to the network management apparatus.

6 Claims, 31 Drawing Sheets

(56) References Cited

U.S. PATENT DOCUMENTS

| | | | |
|---|---|---|---|
| 10,547,561 B1* | 1/2020 | Patel | H04L 47/56 |
| 2003/0202517 A1* | 10/2003 | Kobayakawa | H04L 49/30 |
| | | | 370/395.4 |
| 2005/0174944 A1* | 8/2005 | Legault | H04L 47/826 |
| | | | 370/235.1 |
| 2007/0008884 A1* | 1/2007 | Tang | H04L 9/40 |
| | | | 370/230 |
| 2007/0058548 A1* | 3/2007 | Babonneau | H04L 47/215 |
| | | | 370/235.1 |
| 2007/0280245 A1* | 12/2007 | Rosberg | H04L 47/27 |
| | | | 370/392 |
| 2008/0008095 A1* | 1/2008 | Gilfix | H04L 67/1008 |
| | | | 370/235 |
| 2008/0095053 A1* | 4/2008 | Chen | H04L 47/10 |
| | | | 370/230.1 |
| 2008/0192636 A1* | 8/2008 | Briscoe | H04L 47/18 |
| | | | 370/236 |
| 2009/0003204 A1* | 1/2009 | Okholm | H04L 69/12 |
| | | | 370/230 |
| 2010/0085874 A1* | 4/2010 | Noy | H04L 47/215 |
| | | | 370/230 |
| 2010/0157830 A1* | 6/2010 | Yazaki | H04L 41/0896 |
| | | | 713/320 |
| 2010/0208614 A1* | 8/2010 | Harmatos | H04L 47/215 |
| | | | 370/253 |
| 2011/0235509 A1* | 9/2011 | Szymanski | H04L 47/30 |
| | | | 370/230 |
| 2011/0320631 A1* | 12/2011 | Finkelstein | H04L 47/10 |
| | | | 370/468 |
| 2012/0092993 A1* | 4/2012 | Kan | H04L 47/12 |
| | | | 370/235 |
| 2012/0218891 A1* | 8/2012 | Sundararajan | H04L 47/27 |
| | | | 370/231 |
| 2013/0039179 A1* | 2/2013 | Chapman | H04L 47/41 |
| | | | 370/230.1 |
| 2013/0298123 A1* | 11/2013 | Zuo | H04L 65/80 |
| | | | 718/1 |
| 2013/0332620 A1* | 12/2013 | Gahm | H04L 65/60 |
| | | | 709/231 |
| 2015/0063116 A1* | 3/2015 | Matsumura | H04L 47/215 |
| | | | 370/235.1 |
| 2016/0226774 A1* | 8/2016 | Farmanbar | H04L 41/14 |
| 2016/0259569 A1* | 9/2016 | Povzner | G06F 13/102 |
| 2017/0019811 A1* | 1/2017 | Parulkar | H04W 8/04 |
| 2017/0155590 A1* | 6/2017 | Dillon | H04L 12/2867 |
| 2019/0007338 A1* | 1/2019 | To | H04L 47/783 |
| 2019/0068483 A1* | 2/2019 | Loveless | H04L 45/22 |
| 2019/0140964 A1* | 5/2019 | Southworth | H04L 47/22 |
| 2019/0158371 A1* | 5/2019 | Dillon | H04L 47/196 |
| 2019/0324432 A1* | 10/2019 | Cella | G06N 3/042 |
| 2019/0340716 A1* | 11/2019 | Cella | G06Q 40/04 |
| 2020/0026575 A1* | 1/2020 | Guim Bernat | H04L 47/82 |
| 2020/0167196 A1* | 5/2020 | Smith | H04L 41/5054 |
| 2020/0274831 A1* | 8/2020 | Wei | H04L 47/56 |
| 2020/0287834 A1* | 9/2020 | Ramanathan | H04L 47/12 |
| 2020/0382427 A1* | 12/2020 | Nadas et al. | H04L 47/2441 |
| 2020/0389403 A1* | 12/2020 | Buddhikot | H04L 47/215 |
| 2021/0119922 A1* | 4/2021 | Zhang | H04L 43/16 |
| 2021/0191650 A1* | 6/2021 | Vansteenkiste | H04L 67/1097 |
| 2021/0314342 A1* | 10/2021 | Oberg | H04L 63/20 |
| 2021/0359949 A1* | 11/2021 | Zhang | H04L 47/50 |
| 2022/0217096 A1* | 7/2022 | Hewson | H04L 45/24 |
| 2023/0144074 A1* | 5/2023 | Szilagyi | H04L 45/245 |
| | | | 370/235 |

FOREIGN PATENT DOCUMENTS

| | | | | |
|---|---|---|---|---|
| EP | 3414932 B1 * | 9/2020 | | H04L 12/1403 |
| JP | 2009206698 A | 9/2009 | | |
| JP | 2010148023 A | 7/2010 | | |
| JP | 2018148453 A | 9/2018 | | |
| JP | 2019118072 A | 7/2019 | | |
| WO | WO-2006082443 A1 * | 8/2006 | | H04L 47/10 |

OTHER PUBLICATIONS

Masaharu Inoue et al., Realized with Streaming Telemetry! !! The road to sign detection in silent failure, JANOG41 meeting, Jan. 24, 2018, https://www.janog.gr.jp/meeting/janog41/application/files/5715/1685/7529/janog41-telemetry-02.pdf.

* cited by examiner

Fig. 5

| TRAFFIC CONTROL | TRAFFIC CONTROL ID |
|---|---|
| DELAY GUARANTEED SHAPING UNIT #1 | #1 |
| DELAY GUARANTEED SHAPING UNIT #2 | #2 |
| ... | ... |
| DELAY GUARANTEED SHAPING UNIT #N | #N |

Fig. 7

DELAY PARAMETER TABLE

| ITEM | VALUE |
|---|---|
| MAXIMUM DELAY Dd [ms] | 15 |
| NETWORK DELAY Dr [ms] | 5 |
| TOKEN SUPPLY CYCLE Tc [ms] | 0.1 |
| TOKEN SUPPLY FUNCTION UPDATE CYCLE Tu [ms] | 0.5 |
| TOKEN SUPPLY FUNCTION REFLECTION CYCLE Tr [ms] | 0.5 |

Fig. 8

TELEMETRY PARAMETER TABLE

| ITEM | VALUE |
|---|---|
| TELEMETRY PACKET GENERATION CYCLE | 1[ms] |
| TELEMETRY PACKET GENERATION RULE | MAXIMUM VALUE |
| TELEMETRY PACKET TRANSMISSION DESTINATION | IP ADDRESS OF NETWORK MANAGEMENT APPARATUS |
| PROTOCOL | TCP |
| DATA FORMAT | JSON |

Fig. 9

TELEMETRY GENERATION MEMORY

| NUMBER | VALUE [bytes] |
|---|---|
| 0 | 100 |
| 1 | 100 |
| 2 | 100 |
| 3 | 100 |
| 4 | 200 |
| 5 | 200 |
| 6 | 200 |
| 7 | 300 |
| 8 | 300 |
| 9 | 300 |

Fig. 10

| TRANSMISSION DESTINATION | IP ADDRESS OF NW MANAGEMENT APPARATUS #P |
|---|---|
| TRANSMISSION SOURCE | IP ADDRESS OF EDGE APPARATUS #A |
| | TCP HEADER |
| PAYLOAD | {<br>"TIME POINT": 1573435772.152,<br>"NW ID":"X"<br>"EDGE APPARATUS ID": "A",<br>"TRAFFIC CONTROL ID": "#1",<br>"TELEMETRY PACKET GENERATION RULE": "MAXIMUM VALUE",<br>"TELEMETRY DATA": {<br>"0" : 24000000<br>~ ~ |

Fig. 12

| TIME POINT | NETWORK ID | EDGE APPARATUS ID | TRAFFIC CONTROL ID | TELEMETRY GENERATION RULE | THROUGHPUT [bps] |
|---|---|---|---|---|---|
| 1573435772.152 | X | A | 1 | MAXIMUM VALUE | 24000000 |
| 1573435772.152 | X | B | 2 | MAXIMUM VALUE | 104000000 |
| 1573435772.152 | X | C | 1 | MAXIMUM VALUE | 52000000 |
| 1573435772.152 | X | D | 3 | MAXIMUM VALUE | 80000000 |
| 1573435772.152 | X | D | 4 | MAXIMUM VALUE | 32000000 |
| 1573435772.153 | X | A | 1 | MAXIMUM VALUE | 32000000 |
| 1573435772.153 | X | B | 2 | MAXIMUM VALUE | 8000000 |
| 1573435772.153 | X | C | 1 | MAXIMUM VALUE | 52000000 |
| 1573435772.153 | X | D | 3 | MAXIMUM VALUE | 160000000 |
| 1573435772.153 | X | D | 4 | MAXIMUM VALUE | 12000000 |
| 1573435772.154 | X | A | 1 | MAXIMUM VALUE | 24000000 |
| 1573435772.154 | X | B | 2 | MAXIMUM VALUE | 16000000 |
| 1573435772.154 | X | C | 1 | MAXIMUM VALUE | 8000000 |
| 1573435772.154 | X | D | 3 | MAXIMUM VALUE | 320000000 |
| 1573435772.154 | X | D | 4 | MAXIMUM VALUE | 20000000 |
| 1573435772.155 | X | A | 1 | MAXIMUM VALUE | 32000000 |
| 1573435772.155 | X | B | 2 | MAXIMUM VALUE | 10000000 |
| 1573435772.155 | X | C | 3 | MAXIMUM VALUE | 40000000 |
| 1573435772.155 | X | D | 4 | MAXIMUM VALUE | 60000000 |
| 1573435772.155 | X | D | 1 | MAXIMUM VALUE | 20000000 |
| 1573435772.156 | X | A | 1 | MAXIMUM VALUE | 16000000 |
| 1573435772.156 | X | B | 2 | MAXIMUM VALUE | 32000000 |
| 1573435772.156 | X | C | 1 | MAXIMUM VALUE | 160000000 |
| 1573435772.156 | X | D | 3 | MAXIMUM VALUE | 160000000 |
| 1573435772.156 | X | D | 4 | MAXIMUM VALUE | 12000000 |
| 1573435772.157 | X | A | 1 | MAXIMUM VALUE | 160000000 |
| ... | ... | ... | ... | ... | ... |

Fig. 13

| NETWORK ID | TIME POINT | NW TRAFFIC AMOUNT |
|---|---|---|
| X | 1573435772.152 | 198400000 |
| X | 1573435772.153 | 264000000 |
| X | 1573435772.154 | 460000000 |
| X | 1573435772.155 | 162000000 |
| X | 1573435772.156 | 380000000 |
| ... | ... | ... |

Fig. 16

| EDGE APPARATUS | PATH DELAY TO NETWORK X |
|---|---|
| #A | 1ms |
| #B | 2ms |
| #C | 1ms |
| #D | 3ms |
| #E | 4ms |
| ... | ... |

Fig. 17

| ARRIVAL TIME POINT | NETWORK ID | EDGE APPARATUS ID | TRAFFIC CONTROL ID | TELEMETRY GENERATION RULE | THROUGHPUT |
|---|---|---|---|---|---|
| 1573435772.153 | X | A | 1 | MAXIMUM VALUE | 24000000 |
| 1573435772.154 | X | B | 2 | MAXIMUM VALUE | 10400000 |
| 1573435772.153 | X | C | 1 | MAXIMUM VALUE | 52000000 |
| 1573435772.155 | X | D | 3 | MAXIMUM VALUE | 80000000 |
| 1573435772.155 | X | D | 4 | MAXIMUM VALUE | 32000000 |
| 1573435772.154 | X | A | 1 | MAXIMUM VALUE | 32000000 |
| 1573435772.155 | X | B | 2 | MAXIMUM VALUE | 8000000 |
| 1573435772.154 | X | C | 1 | MAXIMUM VALUE | 52000000 |
| 1573435772.156 | X | D | 3 | MAXIMUM VALUE | 160000000 |
| 1573435772.156 | X | D | 4 | MAXIMUM VALUE | 12000000 |
| 1573435772.155 | X | A | 1 | MAXIMUM VALUE | 24000000 |
| 1573435772.156 | X | B | 2 | MAXIMUM VALUE | 16000000 |
| 1573435772.155 | X | C | 1 | MAXIMUM VALUE | 80000000 |
| 1573435772.157 | X | D | 3 | MAXIMUM VALUE | 320000000 |
| 1573435772.157 | X | D | 4 | MAXIMUM VALUE | 20000000 |
| 1573435772.156 | X | A | 1 | MAXIMUM VALUE | 32000000 |
| 1573435772.157 | X | B | 2 | MAXIMUM VALUE | 10000000 |
| 1573435772.156 | X | C | 1 | MAXIMUM VALUE | 40000000 |
| 1573435772.158 | X | D | 3 | MAXIMUM VALUE | 60000000 |
| 1573435772.158 | X | D | 4 | MAXIMUM VALUE | 20000000 |
| 1573435772.157 | X | A | 1 | MAXIMUM VALUE | 16000000 |
| 1573435772.158 | X | B | 2 | MAXIMUM VALUE | 32000000 |
| 1573435772.157 | X | C | 1 | MAXIMUM VALUE | 160000000 |
| 1573435772.159 | X | D | 3 | MAXIMUM VALUE | 160000000 |
| 1573435772.159 | X | D | 4 | MAXIMUM VALUE | 12000000 |
| 1573435772.158 | X | A | 1 | MAXIMUM VALUE | 160000000 |
| ... | ... | ... | ... | ... | ... |

Fig. 18

| NETWORK ID | TIME POINT | NW TRAFFIC AMOUNT |
|---|---|---|
| X | 1573435772.153 | 52000000 |
| X | 1573435772.154 | 94400000 |
| X | 1573435772.155 | 224000000 |
| X | 1573435772.156 | 260000000 |
| X | 1573435772.157 | 526000000 |
| X | 1573435772.158 | 128000000 |
| ... | ... | ... |

Fig. 21

| SECTION INFORMATION | SECTION PATH DELAY |
|---|---|
| #A~#H | 1ms |
| #B~#H | 2ms |
| #C~#H | 1ms |
| #D~#I | 3ms |
| #H~#I | 1ms |
| #H~#J | 5ms |
| #I~#K | 1ms |
| #K~#J | 2ms |
| ... | ... |

Fig. 22

| FLOW ID | FLOW INFORMATION | ROUTING INFORMATION |
|---|---|---|
| 0000 | TRANSMISSION TERMINAL #1 TO RECEPTION TERMINAL #1 | #A→#H→#J→#E |
| 0001 | TRANSMISSION TERMINAL #2 TO RECEPTION TERMINAL #2 | #B→#H→#I→#K→#J→#F |
| 0002 | TRANSMISSION TERMINAL #3 TO RECEPTION TERMINAL #3 | #C→#H→#J→#F |
| 0003 | TRANSMISSION TERMINAL #4 TO RECEPTION TERMINAL #4 | #D→#I→#K→#G |
| 0004 | TRANSMISSION TERMINAL #5 TO RECEPTION TERMINAL #5 | #D→#I→#H→#J→#K→#G |
| ⋮ | ⋮ | ⋮ |

Fig. 23

| FLOW ID | NETWORK ID | TRAFFIC CONTROL EDGE APPARATUS ID | TRAFFIC CONTROL ID |
|---|---|---|---|
| 0000 | X | #A | #1 |
| 0001 | X | #B | #2 |
| 0002 | X | #C | #1 |
| 0003 | X | #D | #3 |
| 0004 | X | #D | #4 |
| ... | ... | ... | ... |

Fig. 25

| SECTION | ARRIVAL TIME POINT | THROUGHPUT |
|---|---|---|
| #A→#H | 1573435772.152 | 24000000 |
| #A→#H | 1573435772.153 | 32000000 |
| #A→#H | 1573435772.154 | 24000000 |
| #A→#H | 1573435772.155 | 32000000 |
| #A→#H | 1573435772.156 | 16000000 |
| #B→#H | 1573435772.152 | 10400000 |
| #B→#H | 1573435772.153 | 8000000 |
| #B→#H | 1573435772.154 | 16000000 |
| #B→#H | 1573435772.155 | 10400000 |
| #B→#H | 1573435772.156 | 32000000 |
| #C→#H | 1573435772.152 | 52000000 |
| #C→#H | 1573435772.153 | 52000000 |
| #C→#H | 1573435772.154 | 8000000 |
| #C→#H | 1573435772.155 | 40000000 |
| #C→#H | 1573435772.156 | 16000000 |
| #D→#H | 1573435772.152 | 8000000 |
| #D→#H | 1573435772.153 | 32000000 |
| #D→#H | 1573435772.154 | 16000000 |
| #D→#H | 1573435772.155 | 120000000 |
| #D→#H | 1573435772.156 | 20000000 |
| #D→#H | 1573435772.157 | 60000000 |
| #D→#H | 1573435772.158 | 20000000 |
| #D→#H | 1573435772.159 | 16000000 |
| #D→#H | 1573435772.160 | 12000000 |

| SECTION | ARRIVAL TIME POINT | THROUGHPUT |
|---|---|---|
| #H→#I | 1573435772.154 | 10400000 |
| #H→#I | 1573435772.155 | 8000000 |
| #H→#I | 1573435772.156 | 16000000 |
| #H→#I | 1573435772.157 | 10400000 |
| #H→#I | 1573435772.158 | 32000000 |
| #H→#I | 1573435772.153 | 24000000 |
| #H→#I | 1573435772.153 | 52000000 |
| #H→#I | 1573435772.154 | 32000000 |
| #H→#I | 1573435772.155 | 52000000 |
| #H→#I | 1573435772.155 | 24000000 |
| #H→#I | 1573435772.156 | 8000000 |
| #H→#I | 1573435772.156 | 32000000 |
| #H→#I | 1573435772.156 | 40000000 |
| #H→#I | 1573435772.155 | 32000000 |
| #H→#I | 1573435772.156 | 16000000 |
| #H→#I | 1573435772.157 | 8000000 |
| #H→#I | 1573435772.157 | 16000000 |
| #H→#I | 1573435772.158 | 120000000 |
| #H→#I | 1573435772.159 | 20000000 |
| #H→#I | 1573435772.160 | 120000000 |

Fig. 26

SECTION #A → #H

| TIME POINT | NW TRAFFIC AMOUNT |
|---|---|
| 1573435772.152 | 24000000 |
| 1573435772.153 | 32000000 |
| 1573435772.154 | 24000000 |
| 1573435772.155 | 32000000 |
| 1573435772.156 | 16000000 |
| ... | ... |

SECTION #D → #I

| TIME POINT | NW TRAFFIC AMOUNT |
|---|---|
| 1573435772.152 | 112000000 |
| 1573435772.153 | 1720000000 |
| 1573435772.154 | 340000000 |
| 1573435772.155 | 80000000 |
| 1573435772.156 | 1720000000 |
| ... | ... |

SECTION #H → #J

| TIME POINT | NW TRAFFIC AMOUNT |
|---|---|
| 1573435772.153 | 76000000 |
| 1573435772.154 | 84000000 |
| 1573435772.155 | 104000000 |
| 1573435772.156 | 104000000 |
| 1573435772.157 | 188000000 |
| 1573435772.158 | 20000000 |
| 1573435772.159 | 20000000 |
| 1573435772.160 | 12000000 |
| ... | ... |

NETWORK MANAGEMENT SYSTEMS, EDGE DEVICES, NETWORK MANAGEMENT DEVICES, AND PROGRAMS

CROSS-REFERENCE TO RELATED APPLICATIONS

This application is a 371 U.S. National Phase of International Application No. PCT/JP2020/009529, filed on Mar. 5, 2020. The entire disclosure of the above application is incorporated herein by reference.

TECHNICAL FIELD

The present disclosure relates to a network management system, an edge apparatus, a network management apparatus, and a program that recognize the amount of instantaneous traffic in a network.

BACKGROUND ART

In order to avoid instantaneous congestion in a network, an edge apparatus includes a delay guaranteed shaping function of adjusting packet outputs to the network (see PTLs 1 and 2, for example). When packet transfer is performed between two positions, the delay guaranteed shaping function in PTLs 1 and 2 causes a shaping band to change based on a communication delay for which a minimum communication delay is desired to be guaranteed. The delay guaranteed shaping function is capable of providing a communication delay guarantee to a user while curbing a network load.

CITATION LIST

Patent Literature

PTL 1: JP 2018-148453 A
PTL 2: JP 2019-118072 A
PTL 3: JP 2009-206698 A

Non Patent Literature

NPL 1: Cisco Router-show interfaces https://www.infraexpert.com/study/ciscorouter4.html (retrieved on Feb.16, 2020) NPL 2: https://www.janog.grjp/meeting/janog41/application/files/5715/1685/7529/janog41-telemetry-02.pdf (retrieved on Feb. 16, 2020)

SUMMARY OF THE INVENTION

Technical Problem

In order to perform a delay guarantee service, it is necessary to curb occurrence of delay fluctuation due to instantaneous congestion inside a network and thereby to constantly recognize instantaneous traffic variations. Although there are the following schemes to recognize traffic in a network, all of them have some difficulties.

Scheme 1

NPL 1 discloses that a typical network (NW) apparatus is provided with a mechanism capable of acquiring the amount of traffic transmitted and received from ports at a long time interval such as every five minutes. In the scheme, traffic variations are recognized using this. However, because the average flow amount is basically detected by the scheme in NPL 1, it is difficult to check instantaneous variations in traffic amount as in FIG. 1.

Scheme 2

PTL 3 discloses a scheme in which a maximum short-term variation traffic amount is estimated based on the average traffic amount and the band upper limit value of each line acquired by NPL 1 as in FIG. 2. In order to provide delay guarantee services, it is necessary to permit burst transfer to some extent (a value that is as significantly large as 1 Gbps or 10 Gbps, for example) for each line as in PTL 1. Because a band upper limit value of each line is used in the present scheme, and the band upper limit value is set to a value that is as significantly large as 1 Gbps or 10 Gbps, the maximum short-term variation traffic amount is estimated to be unnecessarily large. It is thus difficult to check instantaneous variations in traffic amount in the present scheme.

Scheme 3

NPL 2 discloses a mechanism called telemetry for measuring the amount of traffic with shorter time granularity by a NW apparatus. However, the time granularity is about 1 second, and it is difficult to detect variations in amount of traffic in a millisecond order. Also, it is necessary to develop an apparatus compatible with telemetry over the entire NW, and it is also difficult to introduce it into an existing NW.

In order to solve the aforementioned difficulties, an object of the present invention is to provide a network management system, an edge apparatus, a network management apparatus, and a program capable of being introduced into an existing network and recognizing instantaneous variations in traffic inside a network.

Means for Solving the Problem

In order to achieve the aforementioned object, the network management system according to the present invention is adapted to introduce a network management apparatus that acquires an instantaneous throughput value from each edge apparatus in a network, adds up throughput values of the same network ID and the same time point, and regards a sum of the throughput values as a network traffic amount.

Specifically, a network management system according to the present invention includes: a plurality of edge apparatuses connected to a network; and a network management apparatus connected to the plurality of edge apparatuses. Each of the plurality of edge apparatuses includes a shaping function for transferring a packet input from a user apparatus to the network using a token bucket algorithm, a token supply amount control function for supplying a token to the shaping function, and a notification function for storing the amount of tokens supplied by the token supply amount control function to the shaping function and notifying the network management apparatus of data including a time point and an instantaneous throughput value calculated from the total amount of tokens in every set notification cycle. The network management apparatus includes an acquisition function for acquiring the data from each of the plurality of edge apparatuses, and a management function for adding up instantaneous throughput values of all the data at an identical time point and regarding a sum of the instantaneous throughput values as an instantaneous traffic amount at the identical time point in the network.

Note that the token supply amount control function performs delay guaranteed shaping control in which a token supply function is updated in response to the amount of input packet, a delay time of the communication network to a transfer destination of the input packet, and a communication delay time guaranteed by a communication flow of the input packet for every individual predetermined control period and the amount of tokens supplied to the shaping function is caused to change in accordance with the token supply function.

Also, an edge apparatus according to the present invention is a plurality of edge apparatuses connected to a network. The edge apparatuses includes: a shaping function for transferring a packet input from a user apparatus to the network using a token bucket algorithm; a token supply amount control function for performing delay guaranteed shaping control in which a token supply function is updated in response to the amount of input packet, a delay time of the network to a transfer destination of the input packet, and a communication delay time guaranteed by a communication flow of the input packet for every individual predetermined control period and the amount of tokens supplied to the shaping function is caused to change in accordance with the token supply function; and a notification function for notifying the network management apparatus of data including a time point and an instantaneous throughput value in every set notification cycle.

Moreover, a network management apparatus according to the present invention is connected to a plurality of edge apparatuses arranged in a network. The network management apparatus includes: an acquisition function for acquiring data including a time point and an instantaneous throughput value calculated from the total amount of tokens in every predetermined notification cycle from each of the plurality of edge apparatus; and a management function for adding up instantaneous throughput values of all the data at an identical time point and regarding a sum of the throughput values as an instantaneous traffic amount at the identical time point in the network. Each of the plurality of edge apparatuses includes a shaping function for transferring a packet input from a user apparatus to the network using a token bucket algorithm, and a token supply amount control function for performing delay guaranteed shaping control in which a token supply function is updated in response to the amount of input packet, a delay time of the network to a transfer destination of the input packet, and a communication delay time guaranteed by a communication flow of the input packet for every individual predetermined control period and the amount of tokens supplied to the shaping function is caused to change in accordance with the token supply function.

The scheme of the present invention uses the shaping function included in each edge apparatus. The shaping function controls packet transmission in a millisecond order. The network management apparatus according to the present invention adds up the amount of transmitted packets for each control period reported by each edge apparatus and estimates this as an instantaneous traffic amount in the network. In the scheme, it is only necessary to add one network management apparatus to an existing network and to cause each edge apparatus to report the packet transmission amount to the network management apparatus.

According to the present invention, it is thus possible to provide a network management system, an edge apparatus, and a network management apparatus capable of being introduced into an existing network and recognizing instantaneous variations in traffic in the network.

The network management apparatus of the network management system according to the present invention further includes a path delay database that stores a path delay between an edge apparatus of the plurality of edge apparatuses and the network, and the management function adds path delays of the edge apparatus to each time point of the data acquired from the edge apparatus and regards a sum of the path delays as the time point.

The network management system improves an accuracy of the estimated instantaneous traffic amount in the network by taking delay times from the edge apparatuses to the network into consideration.

The edge apparatus of the network management system according to the present invention includes a plurality of the shaping functions.

The network management apparatus further includes a topology database that stores section delays of sections connecting two edge apparatuses of the plurality of edge apparatuses, a routing information database in which a path between terminals connected to the two edge apparatuses is registered as a flow, and a traffic control information database in which a relationship of the flow, the two edge apparatuses, and traffic control information is stored. The management function includes a section data conversion unit that collates the traffic control information included in the data and indicating which of the plurality of shaping functions the instantaneous throughput value uses with the traffic control information database and identifies the flow, collates the identified flow with the routing information database and acquires the path, expresses the acquired path in combination with the sections, copies the data with the number of the sections combined, allocates each of the sections to the copied data and calculates an arrival time point when the packet will arrive at each of the sections allocated to the copied data by adding up the section delays of the sections through which the packet passes to the sections, with reference to the section delays of the sections stored in the topology database, and a sectionalized traffic amount estimation unit that adds up throughput values of the data at an identical arrival time point for each of the sections and regards a sum of the throughput values as a sectionalized traffic amount.

The network management system improves an accuracy of estimated instantaneous traffic amount in the network by taking a packet transmission path delay into consideration as well.

The present invention provides a program that causes a computer to function as an edge apparatus of the plurality of edge apparatuses or the network management apparatus.

The apparatus according to the present invention can also be implemented by a computer and a program. The program can be recorded in a recording medium and provided through a network.

Note that each of the inventions described above can be combined with the others to the extent possible.

Effects of the Invention

The present invention can provide a network management system, an edge apparatus, a network management apparatus, and a program capable of being introduced into an existing network and recognizing instantaneous variations in traffic in the network.

BRIEF DESCRIPTION OF DRAWINGS

FIG. 5 is a diagram for explaining a traffic control ID recording unit included in the edge apparatus according to the present invention.

FIG. 7 is a diagram for explaining a delay parameter table of the delay guaranteed shaping unit included in the edge apparatus according to the present invention.

FIG. 8 is a diagram for explaining a telemetry parameter table of the delay guaranteed shaping unit included in the edge apparatus according to the present invention.

FIG. 9 is a diagram for explaining a telemetry generation memory of the delay guaranteed shaping unit included in the edge apparatus according to the present invention.

FIG. 10 is a diagram for explaining a telemetry packet generated by the delay guaranteed shaping unit included in the edge apparatus according to the present invention.

FIG. 12 is a diagram for explaining a telemetry database included in the network management apparatus according to the present invention.

FIG. 13 is a diagram for explaining a network traffic amount database included in the network management apparatus according to the present invention.

FIG. 16 is a diagram for explaining a path delay database included in the network management apparatus according to the present invention.

FIG. 17 is a diagram for explaining information stored in a path delay correction telemetry database included in the network management apparatus according to the present invention.

FIG. 18 is a diagram for explaining information stored in the network traffic amount database included in the network management apparatus according to the present invention.

FIG. 21 is a diagram for explaining a topology database included in the network management apparatus according to the present invention.

FIG. 22 is a diagram for explaining a routing information database included in the network management apparatus according to the present invention.

FIG. 23 is a diagram for explaining a traffic control information database included in the network management apparatus according to the present invention.

FIG. 25 is a diagram for explaining a post-conversion section data telemetry database included in the network management apparatus according to the present invention.

FIG. 26 is a diagram for explaining a sectionalized network traffic amount database included in the network management apparatus according to the present invention.

DESCRIPTION OF EMBODIMENTS

Embodiments of the present invention will be described with reference to the accompanying drawings. The embodiments described below are examples of the present invention, and the present invention is not limited to the embodiments described below. Note that constituent elements with the same reference signs in the specification and the drawings are assumed to be the same constituent elements.

First Embodiment

Figure 1:
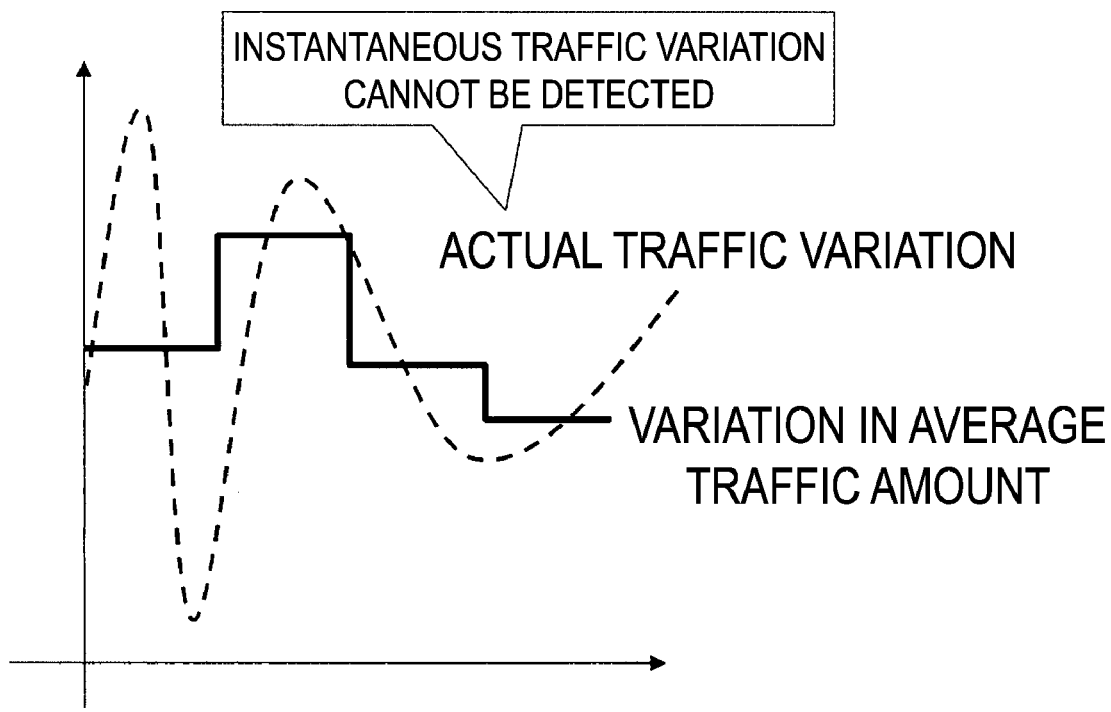
FIG. 1 is a diagram for explaining an object of the present invention.
Figure 2:
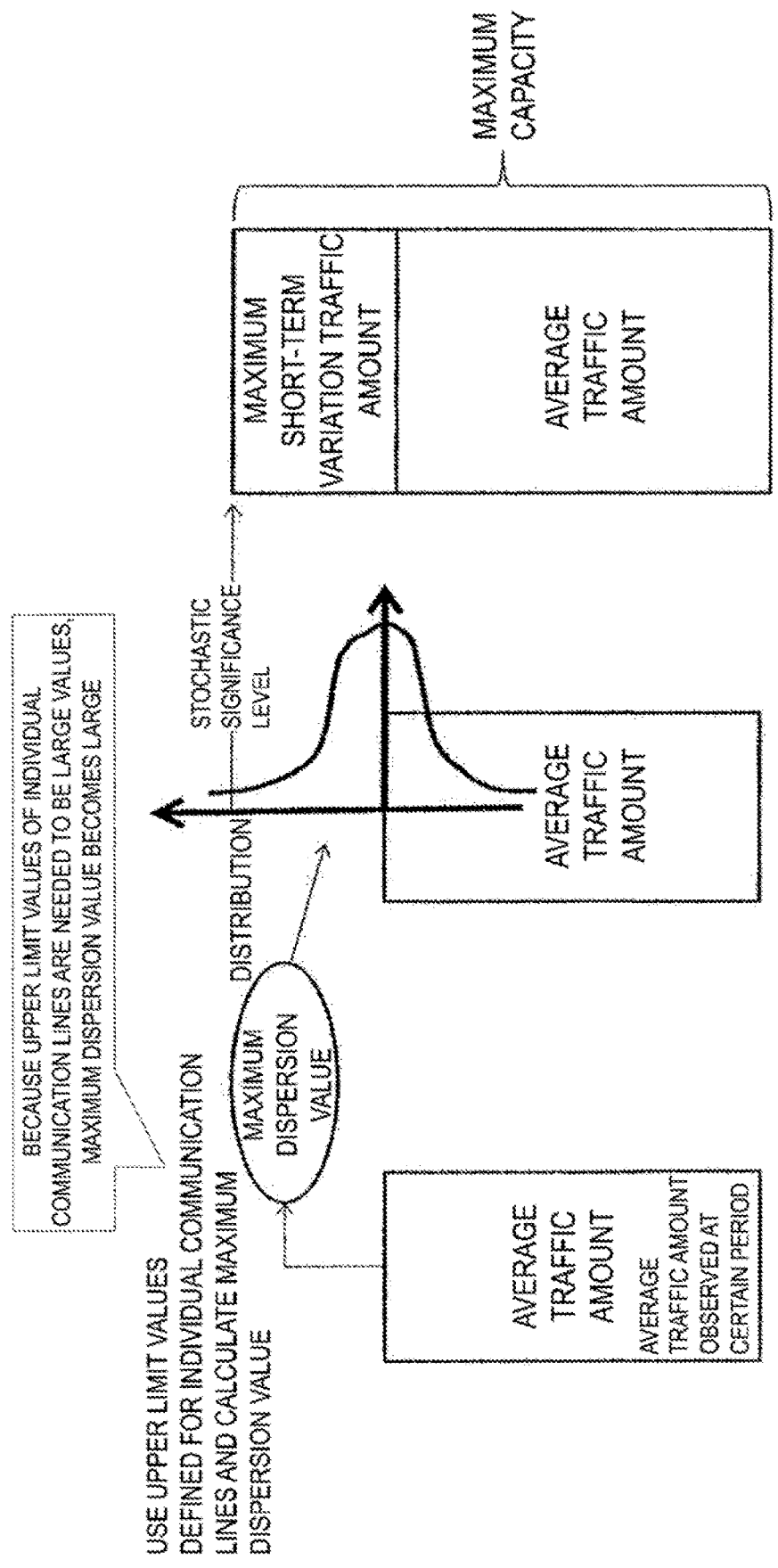
FIG. 2 is a diagram for explaining the object of the present invention.
Figure 3:
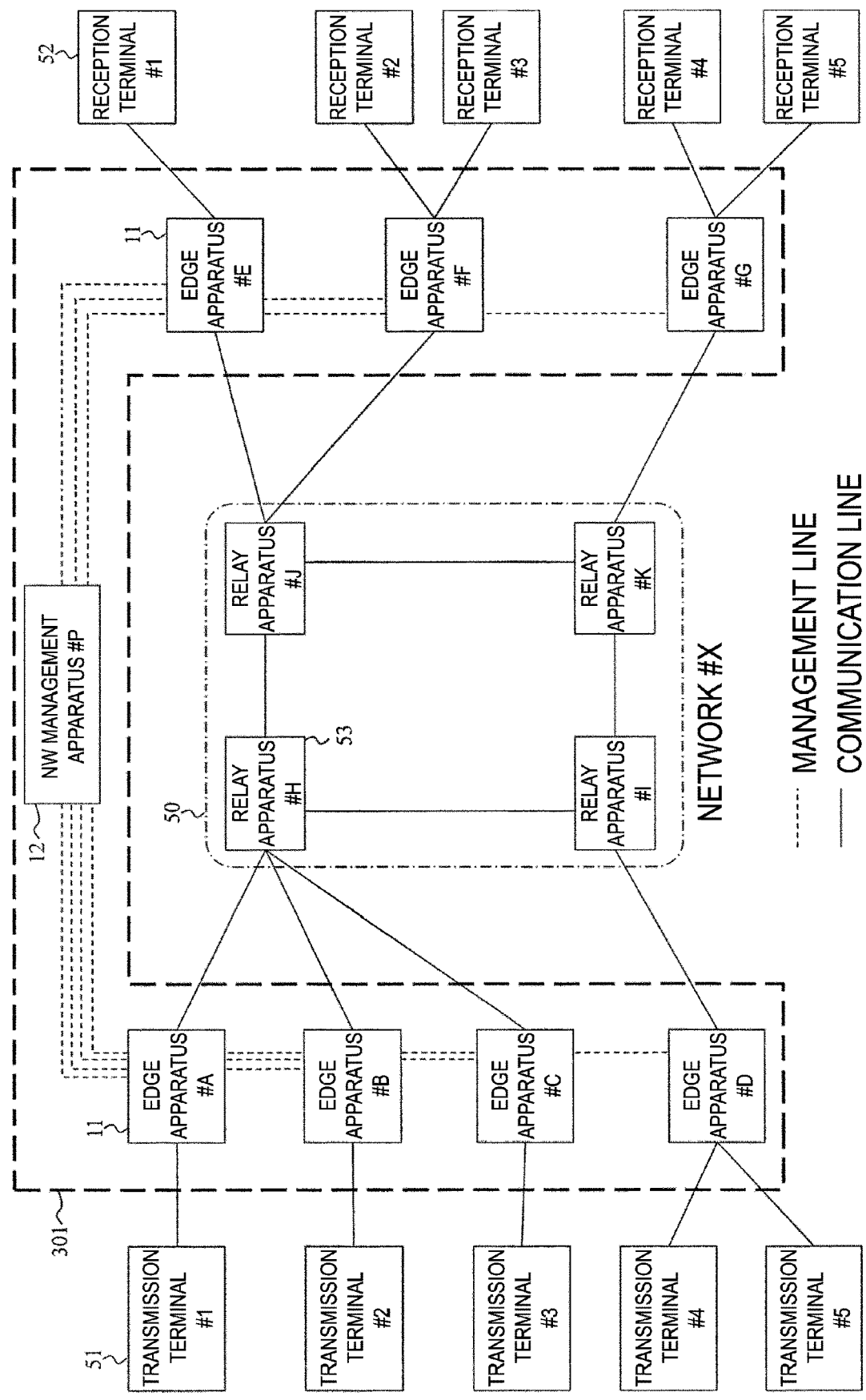
FIG. 3 is a diagram for explaining a network management system according to the present invention.

FIG. 3 is a diagram for explaining a network management system 301 according to the present embodiment. The network management system 301 includes a plurality of edge apparatuses 11 connected to a network 50 and a network management apparatus 12 connected to the edge apparatuses 11. Although the number of edge apparatuses 11 is seven (#A to #G) in FIG. 1, the number of edge apparatuses 11 is not limited to seven. The network 50 includes a plurality of relay apparatuses 53. Although the number of relay apparatuses 53 is four (#H to #K) in FIG. 1, the number of relay apparatuses 53 is not limited to four. The edge apparatuses 11 connect a user apparatus (a transmission terminal 51 or a reception terminal 52) to the relay apparatuses 53.

The user apparatus 51 is an apparatus owned by a user and has a function of transmitting generated data to be transmitted as a transmission packet to the edge apparatuses 11 and receiving a transmission packet transmitted from another user apparatus 52 as a reception packet from the edge apparatuses 11. Here, the user apparatuses (51 and 52) may be terminal apparatuses such as servers or may be broadband routers placed in user homes or termination apparatuses such as optical network units (ONUs).

Figure 4:
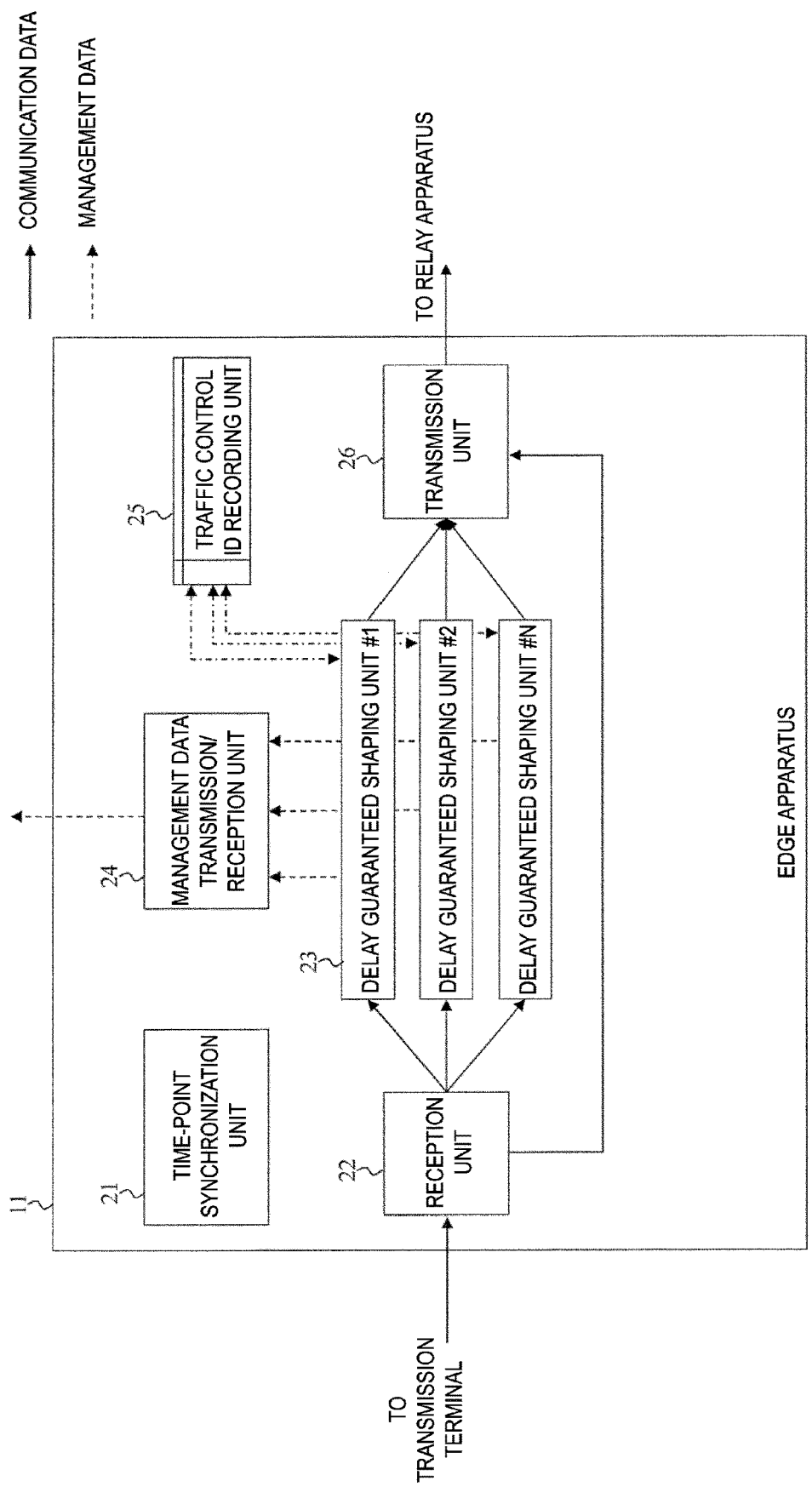
FIG. 4 is a diagram for explaining an edge apparatus according to the present invention.

FIG. 4 is a diagram for explaining each edge apparatus 11. The edge apparatus 11 may be an intra-station termination apparatus such as an optical line terminal (OLT) or a communication apparatus that accommodates a user, such as a switch or a router.

The edge apparatus 11 includes a time point synchronization unit 21, a reception unit 22, delay guaranteed shaping units 23, a management data transmission/reception unit 24, a traffic control ID recording unit 25, and a transmission unit 26. The time point synchronization unit 21 performs time point synchronization with the network management apparatus 12. The reception unit 22 receives packets from the user apparatus (transmission terminal 51). The reception unit 22 may include a user-side reception unit that receives packets transmitted from the user apparatus, a priority information application unit that applies priority class information such that packets are transferred to the network 50 with priority, and a flow separation unit that allocates packets to the shaping units 23 for each communication flow based on information in a flow information table.

The delay guaranteed shaping units 23 control outputs of packets by a scheme described in the appendix. The transmission unit 26 transmits packets output by the delay guaranteed shaping units 23 to relay apparatuses 53 in the network 50. Each edge apparatus 11 includes a plurality of delay guaranteed shaping units 23. The traffic control ID recording unit 25 holds IDs for managing the delay guaranteed shaping units 23. FIG. 5 is a diagram for explaining content held by the traffic control ID recording unit 25. The management data transmission/reception unit 24 transmits telemetry packets generated by the delay guaranteed shaping units 23 to the network management apparatus 12.

Figure 6:
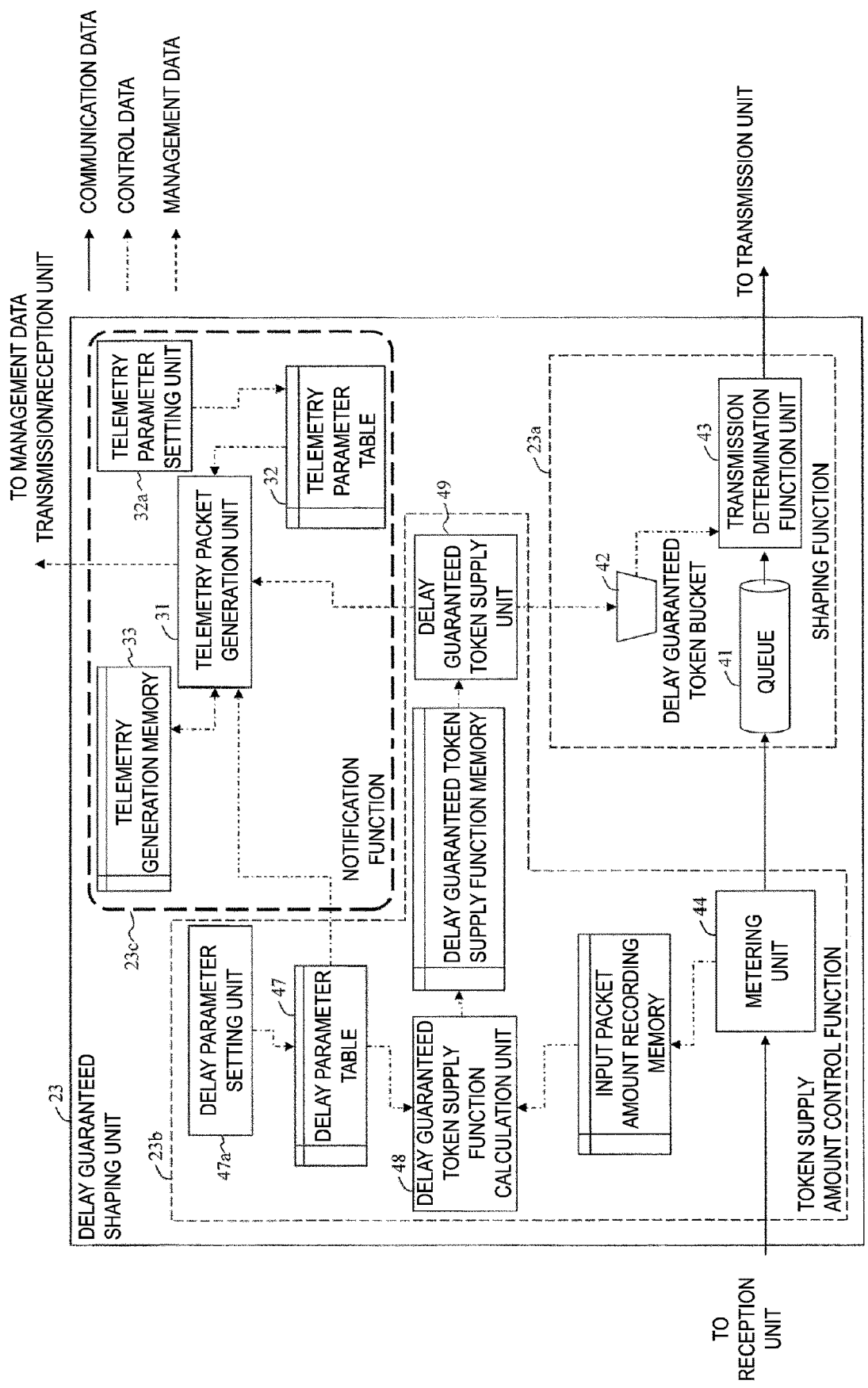
FIG. 6 is a diagram for explaining a delay guaranteed shaping unit included in the edge apparatus according to the present invention.

FIG. 6 is a diagram for explaining the delay guaranteed shaping unit 23. The delay guaranteed shaping unit 23 includes a shaping function 23a for transferring packets input from the user apparatus to the network using a token bucket algorithm, a token supply amount control function 23b for supplying tokens to the shaping function 23a, and a notification function 23c for storing the amount of tokens supplied by the token supply amount control function 23b to the shaping function 23a and notifying the network management apparatus of data including a time point and an instantaneous throughput value calculated from the total amount of tokens in every set notification cycle.

Note that although the present invention can be realized by the token supply amount control function 23b performing token supply in typical shaping/policing, the present embodiment will be described on the assumption that the token supply amount control function 23b performs delay guaranteed shaping.

In other words, the token supply amount control function 23b updates a token supply function in response to the amount of input packets, a delay time of the communication network to a transfer destination of the input packets, and a communication delay time guaranteed by a communication flow of the input packets for every individual predetermined control period and causes the amount of tokens supplied to the shaping function 23a to change in accordance with the token supply function.

The shaping function 23a and the token supply amount control function 23b will be described in the appendix.

The notification function 23c includes a telemetry packet generation unit 31, a telemetry parameter table 32, and a telemetry generation memory 33. FIG. 8 is a diagram for explaining a telemetry parameter table 32. Setting values in the telemetry parameter table 32 may be set from a telemetry parameter setting unit 32a by an operator or the like in advance.

First, a procedure for supply token amount notification reception will be described. The delay guaranteed token supply unit 49 notifies the telemetry packet generation unit 31 of the amount of tokens supplied to the shaping function 23a for each token supply cycle Tc written in the delay parameter table 47. The telemetry packet generation unit 31 stores the amount of tokens provided as the notification in the telemetry generation memory 33. FIG. 9 is a diagram for explaining the telemetry generation memory 33.

Next, a procedure for telemetry packet generation will be described. The telemetry packet generation unit 31 reads all the amounts of tokens stored in the telemetry generation memory 33 and generates telemetry data as follows for each telemetry packet generation cycle in the telemetry parameter table 32.

(A) Case in which a telemetry packet generation rule in the telemetry parameter table 32 is a "maximum value"

A throughput value obtained by dividing a maximum value of the amount of supplied tokens received between telemetry packet generation cycles (notification cycles) by a token supply cycle (control period) is defined as telemetry data. For example, since the telemetry packet generation cycle (notification cycle) is 1 [ms], and the token supply cycle (control period) is 0.1 [ms], the token supply is performed ten times as illustrated in FIG. 9. In the ten times, the maximum value is 300 [bytes] in Nos. 7 to 9. Thus, the instantaneous throughput value in the notification cycle satisfies the instantaneous throughput [bps]=300 [bytes]×8 [bit/byte]÷0.1 [ms]=24000000 [bps].

(B) Case in which a telemetry packet generation rule in the telemetry parameter table 32 is an "average value"

A throughput value obtained by dividing an average value of the amount of supplied tokens received between telemetry packet generation cycles (notification cycles) by the token supply cycle (control period) is defined as telemetry data. For example, since the telemetry packet generation cycle (notification cycle) is 1 [ms], and the token supply cycle (control period) is 0.1 [ms], the token supply is performed ten times as illustrated in FIG. 9. The total amount of tokens in the ten times is 1900 [bytes]. Thus, the instantaneous throughput value in the notification cycle satisfies the instantaneous throughput [bps]=1900 [bytes]×8 [bit/byte]÷1 [ms] =15200000 [bps].

The telemetry packet generation unit 31 generates a telemetry packet of the generated telemetry data, a telemetry packet generation rule, an ID of the network 50 to which the edge apparatus 11 of the telemetry packet generation unit 31 itself is connected, an ID of the edge apparatus 11 to which the telemetry packet generation unit 31 itself belongs, a traffic control ID of the delay guaranteed shaping unit 23 to which the telemetry packet generation unit 31 itself belongs, and a current time point in a data format described in the telemetry parameter table 32. FIG. 10 is a diagram for explaining an example of the telemetry packet.

The telemetry packet generation unit 31 sets a telemetry packet transmission destination (network management apparatus 12) described in the telemetry parameter table 32 as a transmission destination, sets the edge apparatus 11 to which the telemetry packet generation unit 31 itself belongs as a transmission source, and passes the telemetry packet to the management data transmission/reception unit 24. Thereafter, the telemetry packet generation unit 31 deletes all data stored in the telemetry generation memory 33.

The management data transmission/reception unit 24 transmits the telemetry packet to a management line.

Figure 11:
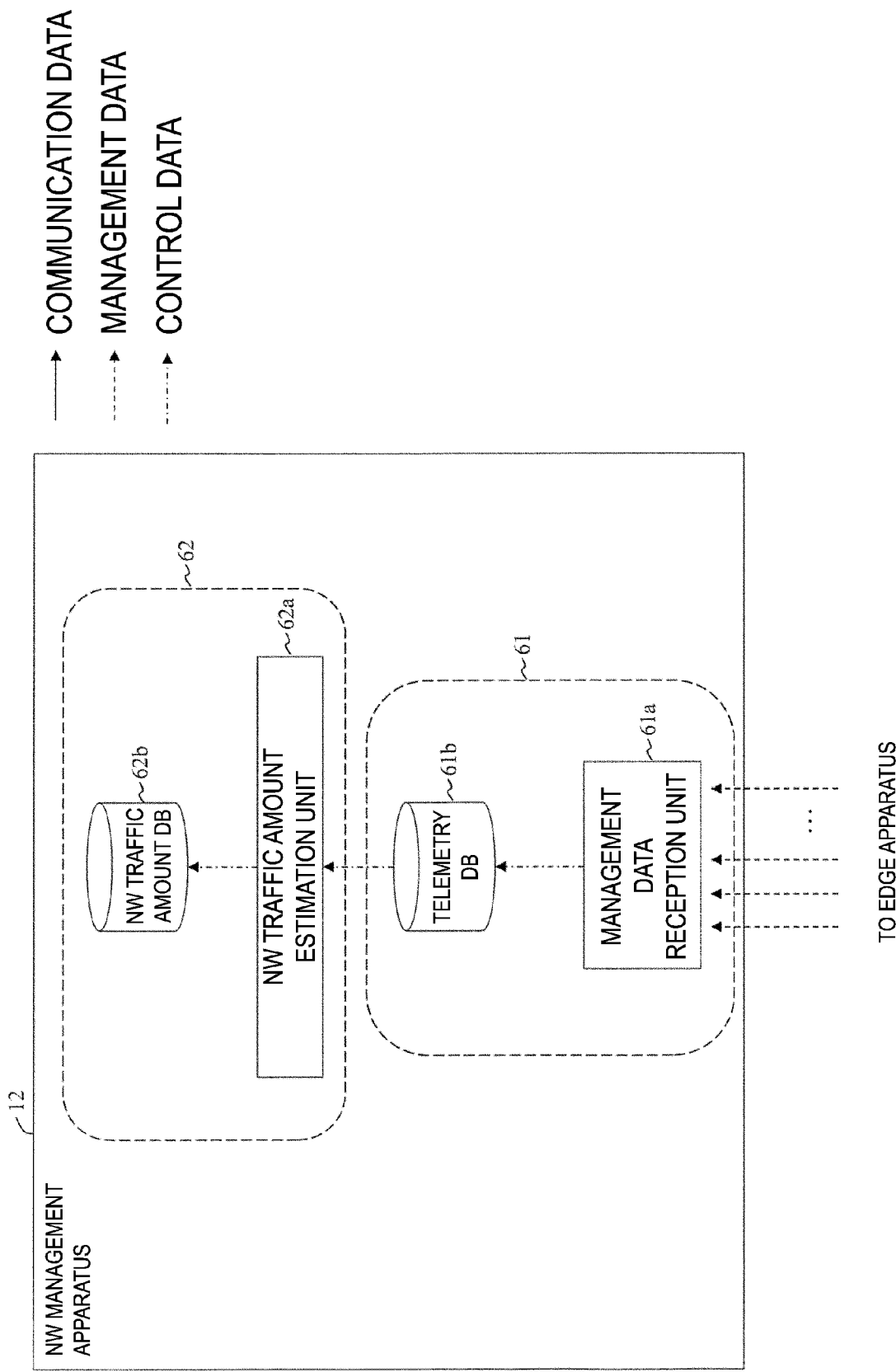
FIG. 11 is a diagram for explaining a network management apparatus according to the present invention.

FIG. 11 is a diagram for explaining the network management apparatus 12. The network management apparatus 12 includes an acquisition function 61 that acquires data (telemetry packet) from each of the edge apparatuses 11 and a management function 62 that adds up instantaneous throughput values of all the data at an identical time point and regards a sum of the instantaneous throughput values as an instantaneous traffic amount at the identical time point in the network.

The acquisition function 61 includes a management data reception unit 61a and telemetry database 61b. The management function 62 includes a network traffic amount estimation unit 62a and a network traffic amount database 62b.

First, a procedure for telemetry packet reception will be described. The management data reception unit 61a records a payload portion of a telemetry packet received from each edge apparatus 11 in the telemetry database 61b. FIG. 12 is a diagram for explaining information stored in the telemetry database 61b. For example, the management data reception unit 61a receives five telemetry packets at a time point 1573435772.152. Among these, a traffic control ID="1", a telemetry generation rule="maximum value", and a throughput="24000000 [bps]" are described in the packet received from the edge apparatus 11 #A, a traffic control ID="2", a telemetry generation rule="maximum value", and a throughput="10400000 [bps]" are described in the packet received from the edge apparatus 11 #B, and a traffic control ID="1", a telemetry generation rule="maximum value", and a throughput="52000000 [bps]" are described in the packet received from the edge apparatus 11 #C. Also, two packets are received from the edge apparatus 11 #D, and a traffic control ID="3", a telemetry generation rule="maximum value", and a throughput="80000000 [bps]" and a traffic control ID="4", a telemetry generation rule="maximum value", and a throughput="32000000 [bps]" are described therein, respectively.

Next, a procedure for traffic amount estimation will be described. The traffic amount estimation unit 62a reads data from the telemetry database 61b, adds up the throughput values at an identical time point included in the same network ID, and regards a sum of the throughput values as an instantaneous traffic amount of the network 50. Then, the traffic amount estimation unit 62a records the calculated instantaneous traffic amount in the network traffic amount database 62b. FIG. 13 is a diagram for explaining information stored in the network traffic amount database 62b. For example, the total instantaneous traffic amount in the network 50 at the time point 1573435772.152 is estimated to be 198400000 [bit/s].

As described above, the network management system 301 according to the present embodiment can recognize instantaneous variations in traffic in the network 50 merely by introducing the network management apparatus 12 into an existing network and adding the notification function 23c to the existing edge apparatus 11.

Second Embodiment

Figure 14:
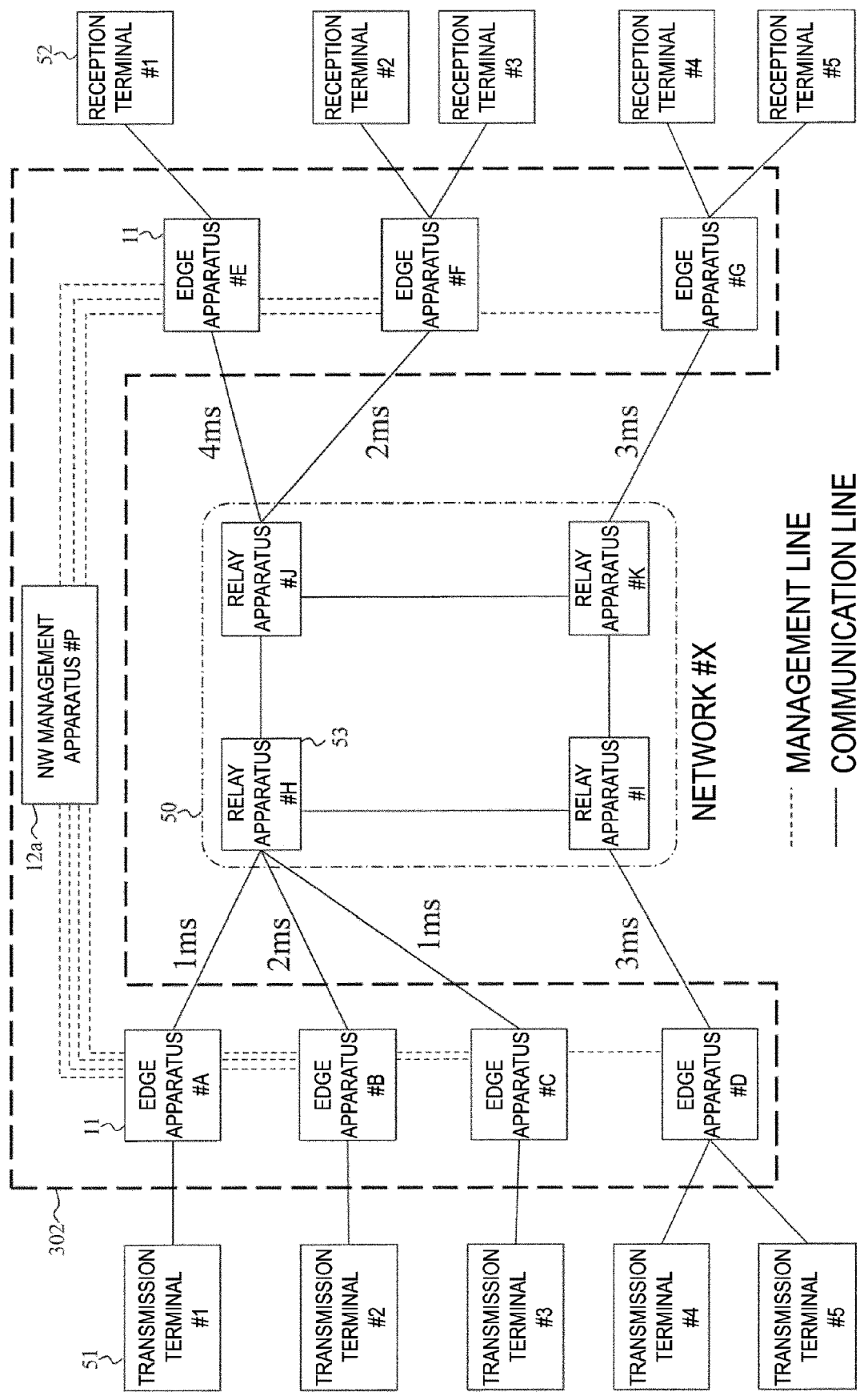
FIG. 14 is a diagram for explaining the network management system according to the present invention.

FIG. 14 is a diagram for explaining a network management system 302 in the present embodiment. The network management system 302 includes a network management apparatus 12a instead of the network management apparatus 12 in the network management system 301 in FIG. 3. In the present embodiment, parts different from those in the network management system 301 in FIG. 3 will be described.

Figure 15:
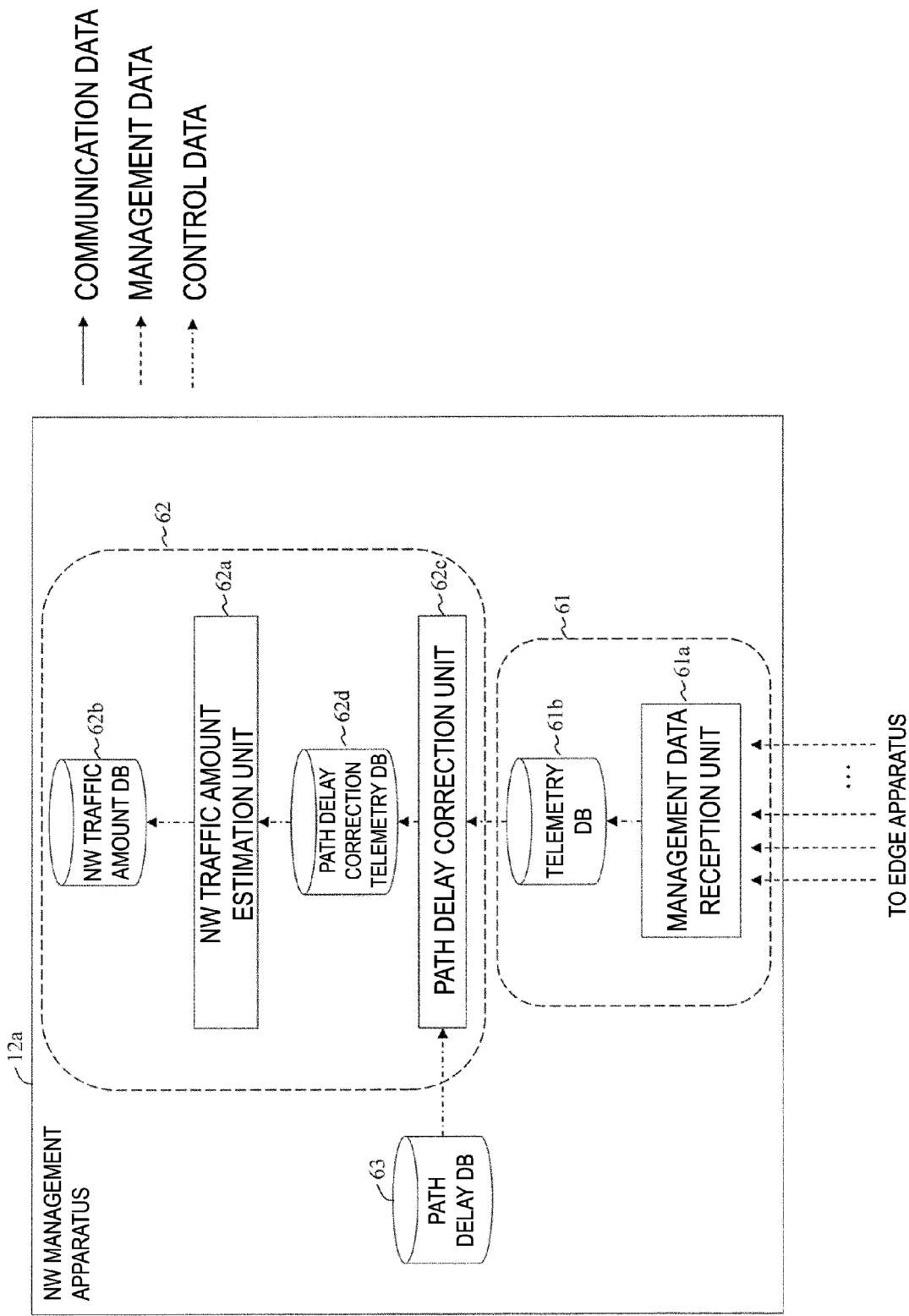
FIG. 15 is a diagram for explaining the network management apparatus according to the present invention.

FIG. 15 is a diagram for explaining the network management apparatus 12a. The network management apparatus 12a further includes a path delay database 63 that stores a path delay between each edge apparatus 11 and the network 50 as compared with the network management apparatus 12, and the management function 62 further includes a path delay correction unit 62c that adds up the path delay of the edge apparatus to the time point of the data acquired from the edge apparatus 11 and regards a sum of the path delay as the time point.

FIG. 16 is a diagram for explaining the path delay database 63. The path delay database 63 stores the path delay from each edge apparatus 11 to the network 50. For example, a packet output from the edge apparatus 11 #A arrives at the network 50 in 1 milliseconds (ms). The path delay stored in the path delay database 63 may be registered by the operator when the network is designed or constructed.

The network management apparatus 12a operates as follows. Note that it is assumed that the telemetry database 61b has already collected the information described in FIG. 12 by the aforementioned procedure for telemetry packet reception.

Here, a procedure for path delay correction will be described. The path delay correction unit 62c reads a path delay of each edge apparatus 11 from the path delay database 63. Moreover, the path delay correction unit 62c reads data from the telemetry database 61b. Then, the path delay correction unit 62c adds a path delay corresponding to an ID of the edge apparatus of the data among the path delays read from the path delay database 63 to the time point recorded in the data and corrects data using this as an arrival time point. Then, the path delay correction unit 62c records the corrected data in the path delay correction telemetry database 62d.

FIG. 17 is a diagram for explaining information stored in the path delay correction telemetry database 62d. It is possible to ascertain from comparison between the information and the information stored in the telemetry database 61b in FIG. 12 that a time point part of data in each row has been corrected. For example, while the time point is 1573435772.152 according to the information stored in the telemetry database 61b in the data in the first row, the delay time of 1 ms from the edge apparatus 11 #A to the network 50 is added, and the arrival time point is 1573435772.153 according to the information stored in the path delay correction telemetry database 62d.

Next, a procedure for traffic amount estimation will be described. The procedure for traffic amount estimation according to the present embodiment uses data from the path delay correction telemetry database 62d instead of data from the telemetry database 61b. In other words, the traffic amount estimation unit 62a reads data from the path delay correction telemetry database 62d, adds up the throughput values at the same arrival time point included in the same network ID, and regards a sum of the throughput values as an instantaneous traffic amount. Then, the traffic amount estimation unit 62a records the calculated instantaneous traffic amount in the network traffic amount database 62b.

FIG. 18 is a diagram for explaining information stored in the network traffic amount database 62b. For example, when the time point (arrival time point) is 1573435772.153, the total instantaneous traffic amount in the network 50 is estimated to be 52000000 [bit/s].

As described above, the network management system 302 according to the present embodiment can more accurately recognize instantaneous variations in traffic in the network 50 as compared with the network management system 301 in the first embodiment because a path delay from the edge apparatus 11 to the network 50 is taken into consideration.

Third Embodiment

Figure 19:
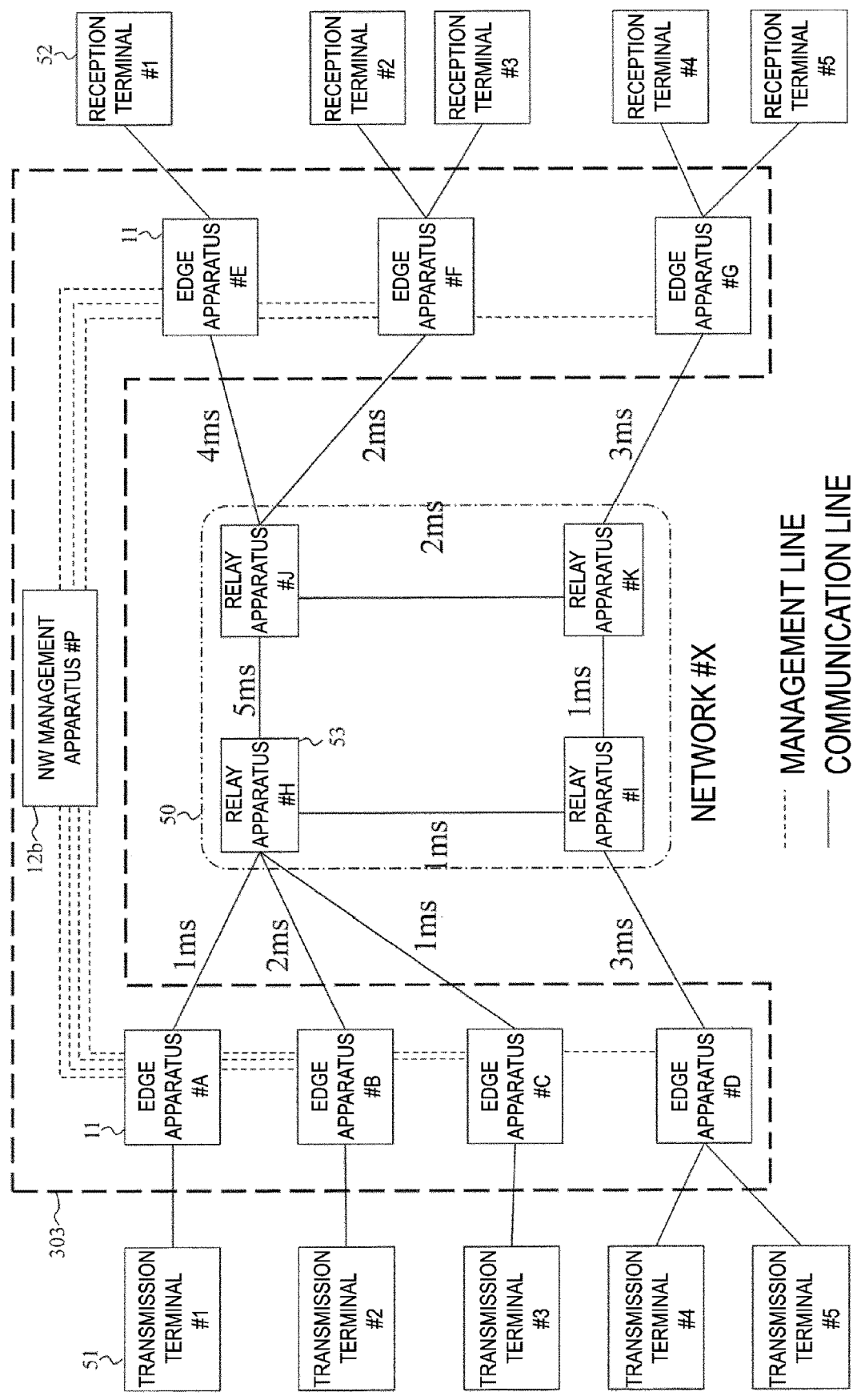
FIG. 19 is a diagram for explaining the network management system according to the present invention.

FIG. 19 is a diagram for explaining a network management system 303 according to the present embodiment. The network management system 303 includes a network management apparatus 12b instead of the network management apparatus 12 in the network management system 301 in FIG. 3. In the present embodiment, parts different from those in the network management system 301 in FIG. 3 will be described.

Figure 20:
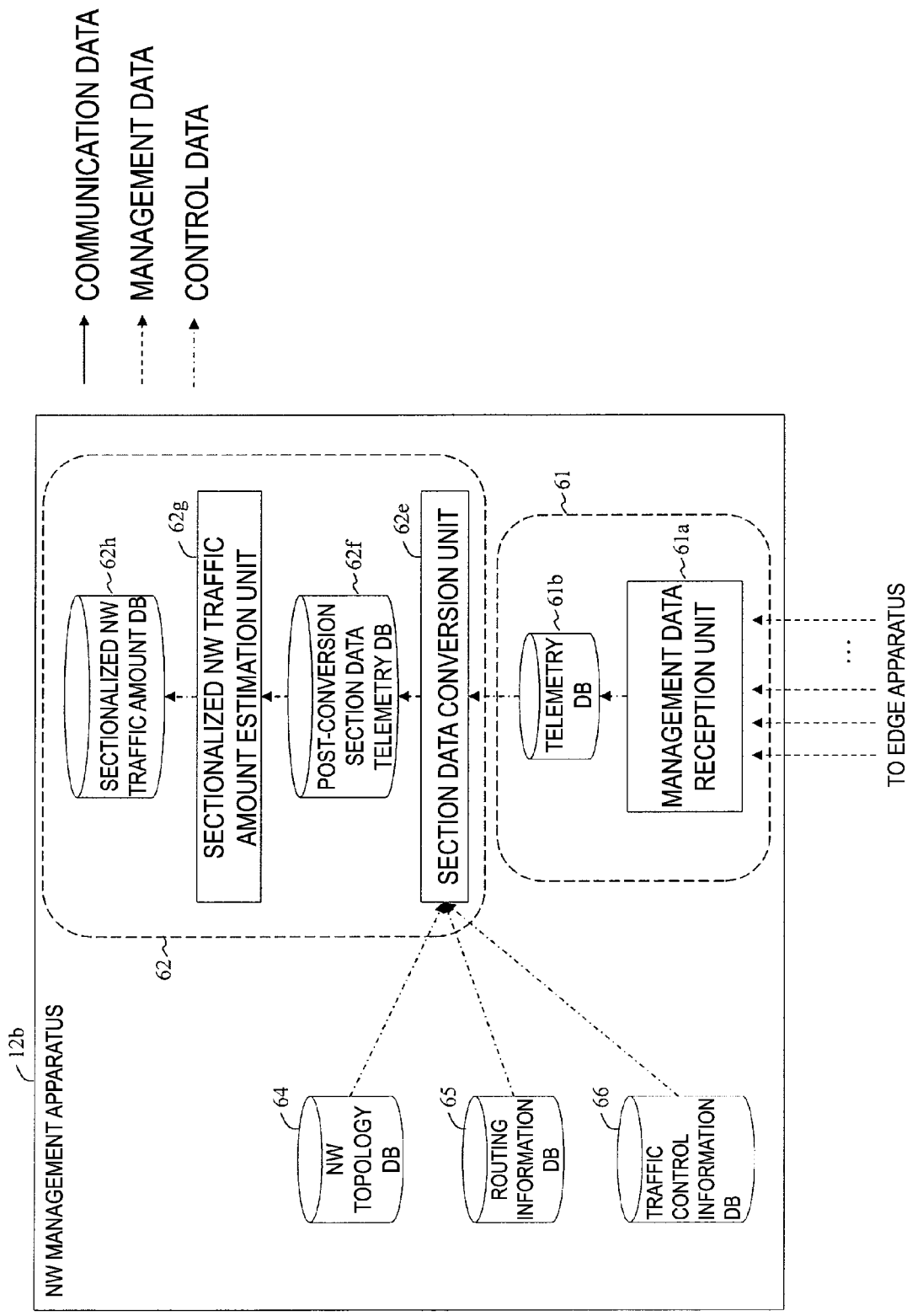
FIG. 20 is a diagram for explaining the network management apparatus according to the present invention.

FIG. 20 is a diagram for explaining the network management apparatus 12b. The network management apparatus 12b further includes a topology database 64 that stores a section delay of a section connecting two edge apparatuses 11, a routing information database 65, in which a path between terminals (the user apparatus 51 to the user apparatus 52) connected to the edge apparatuses 11 is registered as a flow, and a traffic control information database 66, in which a relationship of the flow, the edge apparatuses 11, and the traffic control information is stored.

FIG. 21 is a diagram for explaining the topology database 64. The topology database 64 stores section path delay information, which is a delay time between apparatuses in the network management system 303. For example, a packet output from the edge apparatus 11 #A arrives at the relay apparatus 53 #H in the network 50 in 1 millisecond (ms). Also, a packet output from the relay apparatus 53 #H in the network 50 arrives at the relay apparatus 53 #J in the network 50 in 5 milliseconds (ms), for example. The path delay stored in the topology database 64 may be registered by the operator when the network is designed or constructed.

FIG. 22 is a diagram for explaining the routing information database 65. The routing information database 65 stores a path (routing information) through which packets are transferred between the user apparatuses as a flow. For example, the transfer path from the transmission terminal 51 #1 to the reception terminal 52 #1 passes through the edge apparatus 11 #A, the relay apparatus 53 #H, the relay apparatus 53 #J, and the edge apparatus 11 #E. For example, the transfer path from the transmission terminal 51 #5 to the reception terminal 52 #5 passes through the edge apparatus 11 #D, the relay apparatus 53 #I, the relay apparatus 53 #H, the relay apparatus 53 #J, the relay apparatus 53 #K, and the edge apparatus 11 #G. These paths (routing information) can be routing designated by a controller on the network using a protocol such as Segment Routing, for example. Thus, a routing designation result of the controller may be registered as the paths (routing information) stored in the routing information database 65.

FIG. 23 is a diagram for explaining the traffic control information database 66. The traffic control information database 66 stores information about which edge apparatus 11 is to be used and what kind of traffic control (delay guaranteed shaping) is to be performed on the flow stored in the routing information database 65. In a case of a flow with an ID "0000", for example, the edge apparatus 11 #A performs delay guaranteed shaping with a traffic control ID of "#1". In a case of a flow with an ID "0004", the edge apparatus 11 #D performs delay guaranteed shaping with a traffic control ID of "#4". The information stored in the traffic control information database 66 may be registered by the operator when the network is designed or constructed.

The management function 62 includes a section data conversion unit 62e, a post-conversion section data telemetry database 62f, a sectionalized network traffic amount estimation unit 62g, and a sectionalized network traffic amount database 62h. Although FIG. 20 illustrates that the management function 62 includes only the section data conversion unit 62e, the post-conversion section data telemetry database 62f, and the sectionalized network traffic amount database 62h, the network traffic amount estimation unit 62a, the network traffic amount database 62b, the path delay correction unit 62c, and the path delay correction telemetry database 62d described in FIGS. 11 and 15 may also be included.

The network management apparatus 12b operates as follows. Note that it is assumed that the telemetry database 61b has already collected the information described in FIG. 12 by the aforementioned procedure for telemetry packet reception.

The section data conversion unit 62e collates the traffic control information which is included in the data stored in the telemetry database 61b and indicates which of the shaping functions the instantaneous throughput value uses with the traffic control information database 66 to identify the flow, collates the identified flow with the routing information database 65 to acquire the path, expresses the acquired path in combination with the sections, copies the data with the number of combined sections, allocates the sections to the copied data, and calculates an arrival time when the packet arrives at the sections allocated to the copied data by adding up the delays of the section through which the packet passes to the corresponding section with reference to the delays of the sections stored in the topology database 64.

Then, the sectionalized network traffic amount estimation unit 62g adds up the throughput values of the data at the same arrival time point for each section and regards a sum of the throughput values as a traffic amount of each section.

Figure 24:
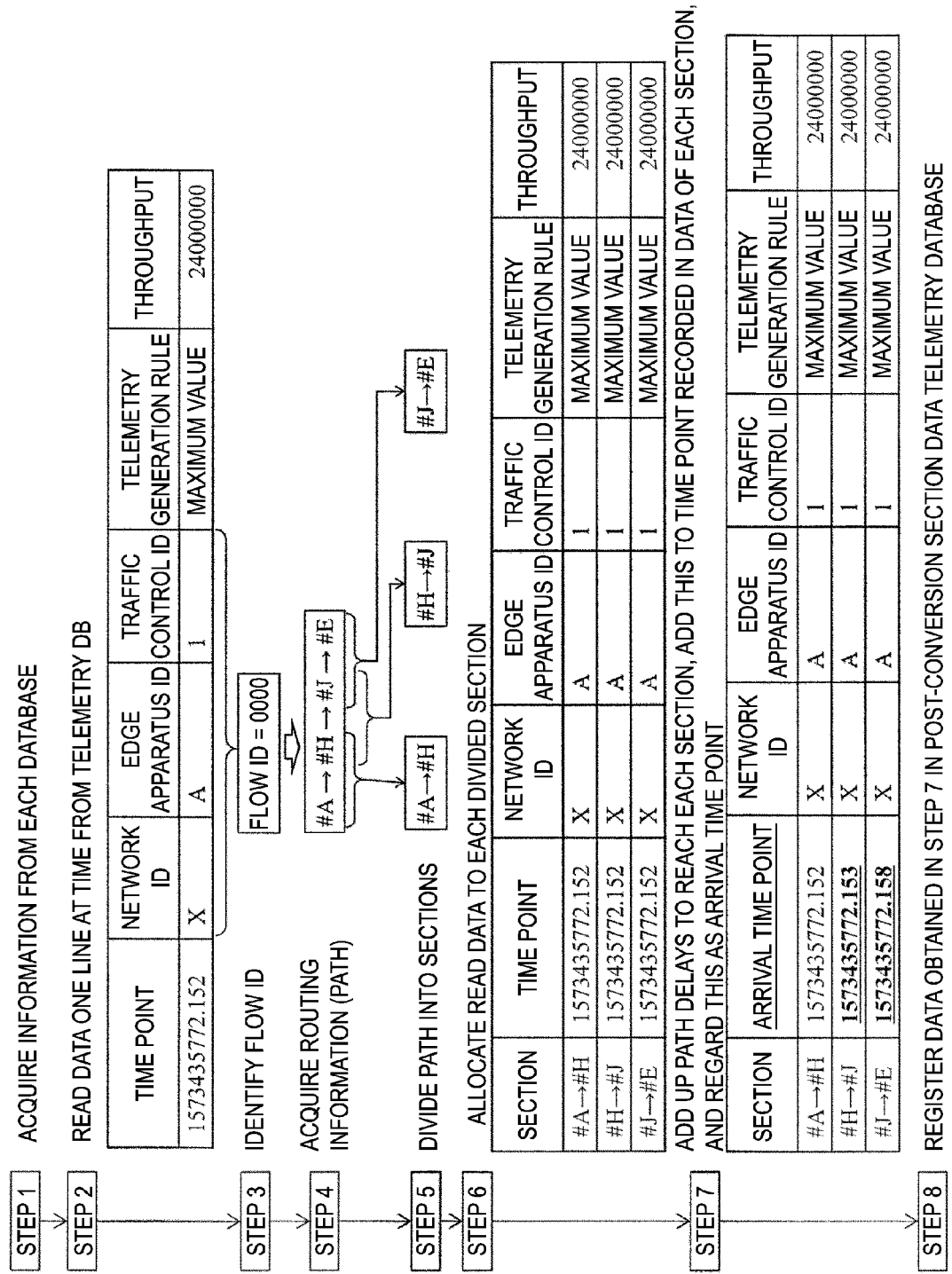
FIG. 24 is a diagram for explaining operations of a section data conversion unit included in the network management apparatus according to the present invention.

A procedure for section data conversion performed by the section data conversion unit 62e will be described in detail using FIGS. 24 to 26. First, the section data conversion unit 62e acquires the following information from each database in Step 1.

Section path delay information is acquired from the network topology database 64.

Routing information of each flow is acquired from the routing information database 65.

A network ID, an edge apparatus ID, and a traffic control ID of each flow are acquired from the traffic control information database 66.

Next, the section data conversion unit 62e reads data one row at a time from the telemetry database 61b in Step 2.

The section data conversion unit 62e collates the network ID, the edge apparatus ID, and the traffic control ID of the data with information from the traffic control information database 66 and identifies a flow ID of the data in Step 3. The section data conversion unit 62e collates the identified flow ID with information in the routing information database 65 and acquires routing information (path) of the data in Step 4.

The section data conversion unit 62e recognizes sections connecting the edge apparatuses and the relay apparatuses on the path from the acquired routing information in Step 5. The section data conversion unit 62e copies the data with the number of sections and allocates them to each section in Step 6.

The section data conversion unit 62e adds up the section path delays until each section is reached using the section path delay information acquired from the network topology database 64 for the copied data of each section in Step 7. The section data conversion unit 62e adds the total value to the time point recorded in data of each section and regards this as an arrival time point.

Specifically, since the section "#H->#J" passes through the sections "#A->#H" before arriving at the section, the section path delay 1 ms acquired from the network topology database 64 is added to the time point 1573435772.152, and an arrival time point 1573435772.153 is obtained.

Similarly, since the section "#J->#E" passes through the sections "#A->#H" and the section "H->#J" before arriving at the section, the section path delay 6 ms (1 ms +5 ms)

acquired from the network topology database 64 is added to the time point 1573435772.152, and an arrival time point 1573435772.158 is obtained.

Finally, the section data conversion unit 62e registers the obtained data in the post-conversion section data telemetry database 62f in Step 8. FIG. 25 is a diagram for explaining information stored in the post-conversion section data telemetry database 62f.

Next, a procedure for sectionalized traffic amount estimation will be described. The sectionalized network traffic amount estimation unit 62g reads data including the same section information and the same arrival time point from the post-conversion section data telemetry database 62f, adds up the throughput values of the data, and regards a sum of the throughput values as a network traffic amount of each section. Then, the sectionalized network traffic amount estimation unit 62g records the calculated network traffic amount of each section in the sectionalized network traffic amount database 62h.

FIG. 26 is a diagram for explaining information stored in the sectionalized network traffic amount database 62h. For example, when the time point (arrival time point) is 1573435772.153, the total instantaneous traffic amount in the section from the edge apparatus 11 #A to the relay apparatus 53 #H in the network 50 is estimated to be 32000000 [bit/s]. Also, when the time point (arrival time point) is 1573435772.157, the total instantaneous traffic amount in the section from the relay apparatus 53 #H to the relay apparatus 53 #J in the network 50 is estimated to be 188000000 [bit/s]. The same applies to the other sections as well.

As described above, the network management system 303 according to the present embodiment can estimate the instantaneous amount of traffic in each section in the network 50 with high accuracy because the path delay and the routing information are taken into consideration.

Fourth Embodiment

The edge apparatus 11 and the network management system (12, 12a, 12b) can also be implemented by a computer and a program, and it is also possible to record the program in a recording medium or to provide the program through a network.

Figure 31:
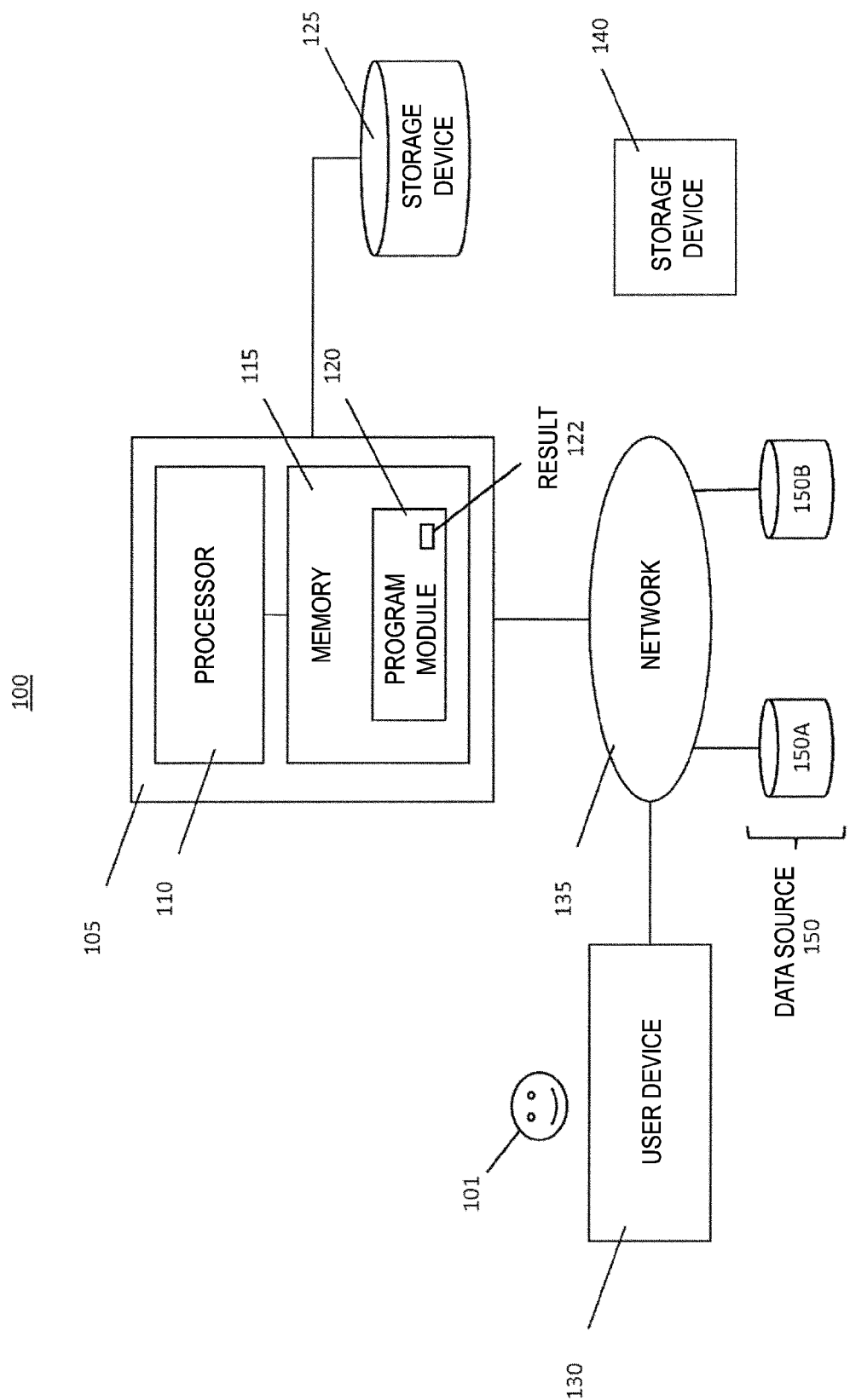
FIG. 31 is a diagram for explaining the edge apparatus or the network management apparatus according to the present invention.

FIG. 31 illustrates a block diagram of a system 100. The system 100 includes a computer 105 connected to a network 135.

The network 135 is a data communication network. The network 135 may be a private network or a public network and can include any one or all of (a) a personal area network covering a certain room, for example, (b) a local area network covering a certain building, for example, (c) a campus area network covering a certain campus, for example, (d) a metropolitan area network covering a certain city, for example, (e) a wide area network covering areas that connect across boundaries of an urban area, a rural area, or a nation, for example, or (0 the Internet. The communication is performed by electronic signals and optical signals via the network 135.

The computer 105 includes a processor 110 and a memory 115 connected to the processor 110. Although the computer 105 is represented herein as a standalone device, it is not so limited, but rather may be connected to other devices not illustrated in a distributed processing system.

The processor 110 is an electronic device configured with logic circuit that responds to and executes instructions.

The memory 115 is a storage medium readable to a tangible computer with a computer program encoded therein. In this regard, the memory 115 stores data and instructions, that is program code, readable and executable by the processor 110 to control operation of the processor 110. The memory 115 can be implemented in a random access memory (RAM), a hard drive, a read-only memory (ROM), or a combination thereof. One of components of the memory 115 is a program module 120.

The program module 120 includes instructions for controlling the processor 110 to execute the processes described herein. Although operations are described herein as being performed by the computer 105 or a method or a process or a sub-process thereof, the operations are actually performed by the processor 110.

The term "module" is used herein to refer to a functional operation that can be embodied as either a stand-alone component or an integrated configuration of a plurality of lower components. Thus, the program module 120 may be achieved as a single module or as a plurality of modules that operate in cooperation with each other. Moreover, while the program module 120 is described herein as being installed in the memory 115 and thus implemented in software, it is also possible to be implemented in any of hardware (for example, electronic circuit), firmware, software, or a combination thereof.

Although the program module 120 is illustrated as already being loaded into the memory 115, it may be configured to be located on a storage device 140 so as to be later loaded into the memory 115. The storage device 140 is a storage medium readable to a tangible computer storing the program module 120. Examples of the storage device 140 include a compact disc, a magnetic tape, a read-only memory, an optical storage media, a memory unit composed of a hard drive or a plurality of parallel hard drives, and a universal serial bus (USB) flash drive. Alternatively, the storage device 140 may be a random access memory or another type of electronic storage device that is located in a remote storage system not illustrated, and is connected to the computer 105 via the network 135.

The system 100 further includes a data source 150A and a data source 150B collectively referred to as a data source 150 herein and communicatively connected to the network 135. In practice, the data source 150 can include any number of data sources, that is, one or more data sources. The data source 150 can include unstructured data and include social media.

The system 100 further includes a user device 130 operated by a user 101 and connected to the computer 105 via the network 135. The user device 130 includes an input device, such as a keyboard or speech recognition subsystem, for enabling the user 101 to transmit information and a selection of commands to the processor 110. The user device 130 further includes an output device, such as a display device or a printer or an audio synthesizer. A cursor control unit, such as a mouse, a trackball, or a touch sensitive screen, allows the user 101 to manipulate the cursor on the display device to transmit additional information and a selection of commands to the processor 110.

The processor 110 outputs a result 122 of execution of the program module 120 to the user device 130. Alternatively, the processor 110 can provide output to a storage device 125, for example a database or a memory, or can provide output to a remote device not illustrated via the network 135.

For example, a program performing the operations described above in the first to third embodiments may be defined as a program module 120. The system 100 can be caused to operate as the edge apparatus 11 or the network management system (12, 12a, 12b).

The terms "includes" or "including", or "comprises" or "comprising" specifies that features, integers, steps, or components described therein are present, but should be interpreted that they do not exclude the presence of one or more other features, integers, steps, or components, or groups thereof. The terms "a" and "an" are indefinite articles and thus do not exclude embodiments having a plurality thereof.

Other Embodiments

Note that the present invention is not limited to the above-described embodiments, and can be variously modified and implemented within the scope not departing from the gist of the present invention. In short, the present invention is not limited to the higher-level embodiment as it is, and can be embodied, at the implementation stage, with the components modified within the scope not departing from the gist thereof.

Appendix

Operations of the delay guaranteed shaping unit 23 will be described using FIG. 6. In the drawing, the arrow of the solid line illustrates a flow of packet transfer, the arrow of the one-dotted dashed line illustrates a flow of control information, and the arrow of the broken line illustrates a flow of management information. The delay guaranteed shaping unit 23 includes a shaping function 23a, a token supply function, a metering function, and a token supply amount control function 23b, which are included in a typical communication apparatus. The token supply function and the metering function are included in the token supply amount control function 23b. Also, the delay guaranteed shaping unit 23 causes the token supply amount control function to have dynamic controllability and causes the token supply function to supply tokens in accordance with control performed by the token supply amount control function.

The shaping function 23a temporarily saves a packet received by a reception unit 22 in a queue 41, and a transmission determination function unit 43 outputs the packet to a transmission unit 26 based on the amount of tokens input to the delay guaranteed token bucket 42. In other words, the shaping function 23a outputs the packet to the network 50 using a token bucket algorithm.

The token supply amount control function 23b includes a metering unit 44 that counts, as a byte amount, packets allocated to the shaping unit 23 and notifies a token supply function calculation unit 48 of the counted byte amount, the token supply function calculation unit 48 that updates a token supply amount function Ts(t) indicating the amount of tokens supplied by the token supply unit 49 to the shaping unit 23a and sets the updated token supply amount function Ts(t) in a token supply unit 49, the token supply unit 49 that supplies tokens to the shaping unit 23a in accordance with the set Ts(t), and a delay parameter table 47 in which communication information of each flow (an apparatus that is a packet transfer destination, priority, and a communication delay time Dd to be guaranteed), operation setting information of the token supply function calculation unit 48 and the token supply unit 49 (a token supply cycle Tc, a token supply function update cycle Tu, and a token supply function reflection cycle Tr), and delay information of the network 50 (a network delay Dr) are described.

FIG. 7 is a diagram for explaining the delay parameter table 47. Setting values in the delay parameter table 47 may be set from the delay parameter setting unit 47a by the operator or the like, in advance.

The communication information for each flow includes, for example, a communication flow number indicating a serial number of a communication flow, a communication flow identifier indicating packet information for identifying the communication flow, a transfer destination accommodation apparatus indicating which of user accommodation apparatuses the communication flow is to be transferred to, intra-NW priority of the flow, and a requested delay time for each communication flow (the communication delay time Dd guaranteed by the communication flow).

The operation setting information includes, for example, a token supply cycle Tc, a token supply function update cycle Tu, and a token supply function reflection cycle Tr.

The delay information includes, for example, a section type indicating a type of a section, a section name indicating a specific section location, a switching process for a communication path length and an apparatus at a location indicated by the section name, and section delay information meaning a minimum communication delay occurring due to packet combining or the like, and the network delay Dr is calculated therefrom.

The token supply amount control function 23b causes the amount of tokens to be supplied to the shaping function 23a to dynamically change in accordance with the token supply function Ts(t).

Specifically, the token supply amount control function 23b calculates the amount of tokens and a supply time based on the amount of packets measured by the metering unit 44, the delay time Dr of the network 50 to the packet transfer destination, and the communication delay time Dd guaranteed by the communication flow of the packet for every individual predetermined control period and updates the token supply function Ts(t).

In other words, the token supply function calculation unit 48 calculates the minimum communication delay to the packet transfer destination based on the delay information of the communication path given in advance and generates the token supply function Ts(t) to control the amount of tokens to be supplied to the shaping unit 23a implemented using the token bucket algorithm in accordance with the metering result of the amount of data of the packet, the minimum communication delay, and a communication delay time to be guaranteed. Then, the token supply unit 49 supplies tokens to the shaping unit 23a in accordance with the token supply function Ts(t).

Figure 27:
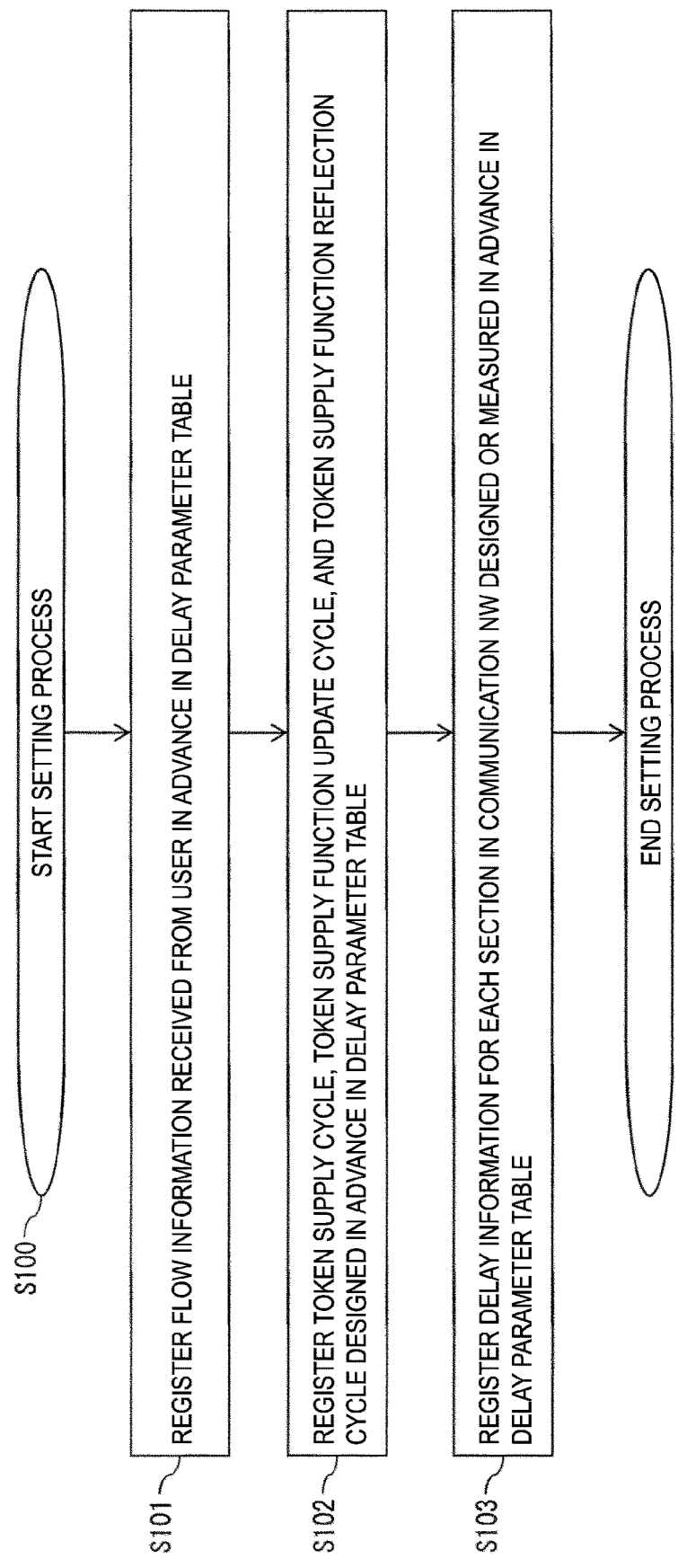
FIG. 27 is a flowchart for explaining operations of the delay guaranteed shaping unit included in the edge apparatus according to the present invention.

FIG. 27 illustrates a setting process flow (S100) performed by the delay guaranteed shaping unit 23. Flow information received from a user in advance is registered in the delay parameter table 47 (Step S101). The token supply cycle Tc, the token supply function update cycle Tu, and the token supply function reflection cycle Tr designed in advance based on calculation capacity of the apparatus, mounted chip performance and the like are registered in the delay parameter table 47 (Step S102). Delay information of each section in the network 50 designed in advance based on measurement, specifications, and physical distances is registered in the delay parameter table 47 (Step S103). The setting process flow may be input directly to the delay guaranteed shaping unit 23 through console connection or the like or may be remotely set by an operation system, a controller, or the like via the network 50.

Figure 28:
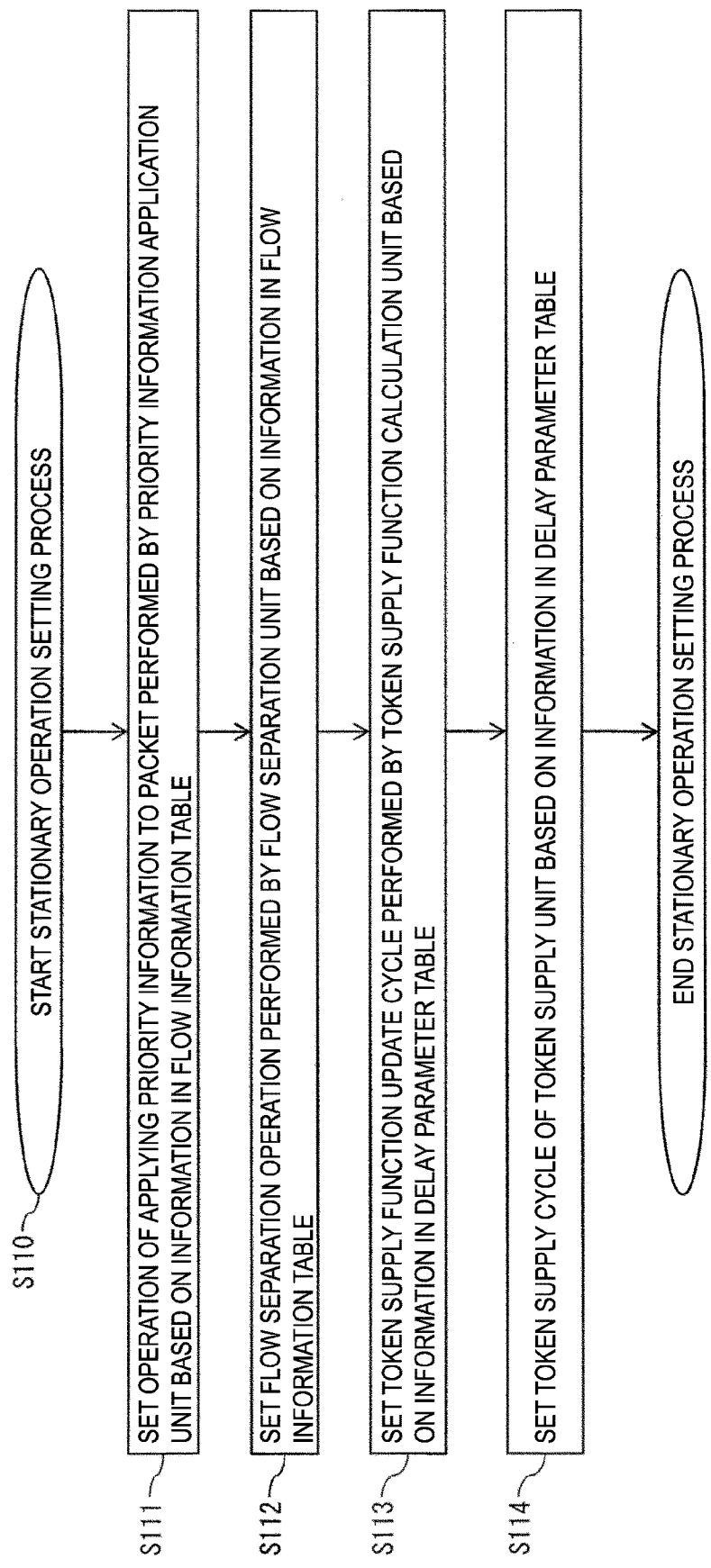
FIG. 28 is a flowchart for explaining operations of the delay guaranteed shaping unit included in the edge apparatus according to the present invention.

FIG. 28 illustrates a stationary operation setting process flow (S110) performed by the reception unit 22 and the delay guaranteed shaping unit 23. For example, an operation of applying priority information to a packet is set based on information in a flow information table, which is not illustrated (Step S111). As a specific operation in S111, setting values of a class of service (CoS) region and a type of service (ToS) region of the packet for the packet with an identifier described in the communication flow identifier is assumed as an example. For example, a flow separation operation performed by the reception unit 23 is set based on information in the flow information table, which is not illustrated (Step S112). As a specific operation in S112, setting which of shaping units 23 the packet with the identifier described in the communication flow identifier is to be allocated to is assumed. The token supply function update cycle in the token supply function calculation unit 48 is set based on the information in the delay parameter table 47 (Step S113). The token supply cycle in the token supply unit 49 is set based on the information in the delay parameter table 47 (Step S114).

Figure 29:
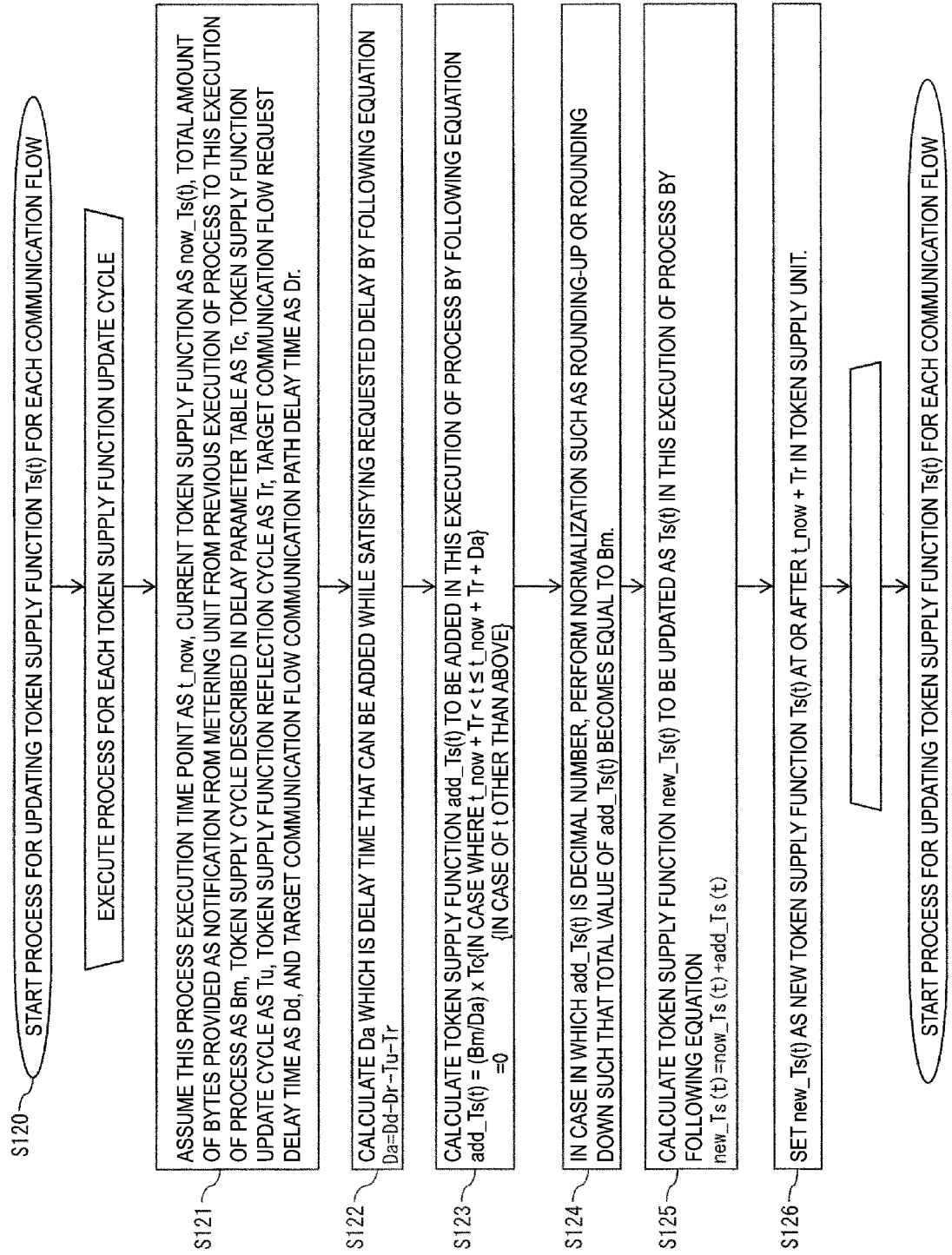
FIG. 29 is a flowchart for explaining operations of the delay guaranteed shaping unit included in the edge apparatus according to the present invention.

FIG. 29 illustrates a flow of a process of updating the token supply function Ts(t) for each communication flow (S120) executed by the token supply function calculation unit 48 of the delay guaranteed shaping unit 23. In a case in which one supply period of tokens calculated based on the amount of packets in one control period overlaps a later supply period of tokens calculated based on the amount of packets in a control period after the one control period, the token supply function calculation unit 48 adds the amount of tokens calculated based on the amount of packets in the later control period to the amount of tokens calculated based on the amount of packets in the one control period, in a period during which the one supply period and the later supply period overlap each other, and updates the token supply function.

The update process is executed at every token supply function update cycle (control period) set in the delay parameter table 47. This process execution time point is defined as t_now, the current token supply function is defined as now_Ts(t), the total amount of bytes provided as a notification from the metering unit 44 from the previous execution of the process to this execution of the process is defined as Bm, the token supply cycle described in the delay parameter table 47 is defined as Tc, the token supply function update cycle is defined as Tu, the token supply function reflection cycle is defined as Tr, the requested delay time of the target communication flow is defined as Dd, and a delay time of the communication path of the target communication flow is defined as Dr (Step S121).

Da which is a delay time that can be added while satisfying the requested delay is calculated by the following equation (Step S122).

$$Da = Dd - Dr - Tu - Tr$$

The token supply function add_Ts(t) to be added in this execution of the process is calculated by the following equation (Step S123).

(1) In a case in which t satisfies t_now+Tr<t<t_now+Tr+Da
add_Ts(t)=(Bm/Da)×Tc
(2) In a case of t other than that in the above case add_Ts(t)=0

In a case in which add_Ts(t) is a decimal number, normalization such as rounding-up or rounding-down is performed such that the total value of add_Ts(t) becomes equal to Bm (Step S124). The token supply function new_Ts(t) to be updated as Ts(t) in this execution of the process is calculated by the following equation (Step S125).

$$new\_Ts(t) = now\_Ts(t) + add\_Ts(t)$$

As new Ts(t) after t=t_now+Tr, new_Ts(t) is set in the token supply unit 49 (Step S126).

Figure 30:
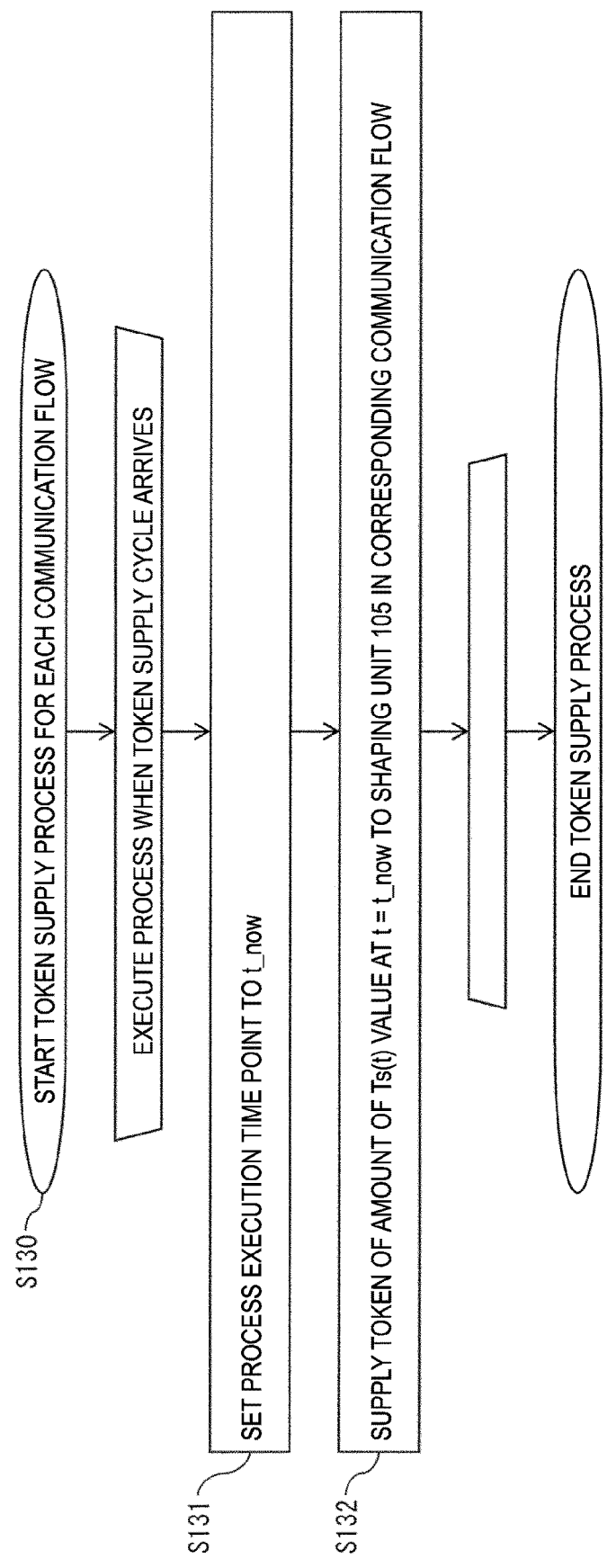
FIG. 30 is a flowchart for explaining operations of the delay guaranteed shaping unit included in the edge apparatus according to the present invention.

FIG. 30 illustrates a flow of a token supply process for each communication flow (S130) executed by the token supply unit 49. The update process is executed at every token supply cycle set in the delay parameter table 47. The process execution time point is defined as t_now (Step S131). The tokens of the amount corresponding to the value of Ts(t) at t=tn_ow are supplied to the shaping unit 23a of the communication flow (Step S132).

REFERENCE SIGNS LIST

11: Edge apparatus
12, 12a, 12b: Network management apparatus
21: Time point synchronization unit
22: Reception unit
23: Delay guaranteed shaping unit
23a: Shaping function
23b: Token supply amount control function
24: Management data transmission/reception unit
25: Traffic set phrase ID recording unit
26: Transmission unit
31: Telemetry packet generation unit
32: Telemetry parameter table
32a: Telemetry parameter setting unit
33: Telemetry generation memory
41: Queue
42: Delay guaranteed token bucket
43: Transmission determination function unit
44: Metering unit
47: Delay parameter table
47a: Delay parameter setting unit
48: Delay guaranteed token supply function calculation unit
49: Delay guaranteed token supply unit
50: Network
51: Transmission terminal (user apparatus)
52: Reception terminal (user apparatus)
53: Relay apparatus
61: Acquisition function
61a: Management data reception unit
61b: Telemetry database
62: Management function
62a: Traffic amount estimation unit
62b: Network traffic amount database
62c: Path delay correction unit
62d: Path delay correction telemetry database
62e: Section data conversion unit
62f: Post-conversion section data telemetry database
62g: Sectionalized network traffic amount estimation unit
62h: Sectionalized network traffic amount database
63: Path delay database
64: Network topology database
65: Routing information database
66: Traffic control information database
100: System
101: User
105: Computer
110: Processor
115: Memory
120: Program module
122: Result
125: Storage device
130: User device
135: Network
140: Storage device
150: Data source
301 to 303: Network management system

The invention claimed is:

1. A network management system comprising:
a plurality of edge apparatuses connected to a network; and
a network management apparatus connected to the plurality of edge apparatuses,
wherein
each of the plurality of edge apparatuses comprises a network interface, at least one processor, and a memory connected to the processor, the at least one processor configured to include
a shaping function configured to transfer a packet input from a user apparatus to the network using a token bucket algorithm,
a token supply amount control function configured to supply a token to the shaping function, and
a notification function configured to store the amount of tokens supplied by the token supply amount control function to the shaping function and notify the network management apparatus of data including a time point and an instantaneous throughput value calculated from the total amount of tokens in every set notification cycle, and
the network management apparatus comprises a network interface, at least one processor, and a memory connected to the processor, the at least one processor configured to include
an acquisition function configured to acquire the data from each of the plurality of edge apparatuses, and a management function configured to add up instantaneous throughput values of all the data at an identical time point and regard a sum of the instantaneous throughput values as an instantaneous traffic amount at the identical time point in the network.

2. The network management system according to claim 1, wherein the token supply amount control function performs delay guaranteed shaping control in which a token supply function is updated in response to the amount of input packet, a delay time of the network to a transfer destination of the input packet, and a communication delay time guaranteed by a communication flow of the input packet for every individual predetermined control period and the amount of tokens supplied to the shaping function is caused to change in accordance with the token supply function.

3. The network management system according to claim 1, wherein
the network management apparatus further includes a path delay database configured to store a path delay between an edge apparatus of the plurality of edge apparatuses and the network, and
the management function adds path delays of the edge apparatus to each time point of the data acquired from the edge apparatus and regards a sum of the path delays as the time point.

4. The network management system according to claim 1, wherein
an edge apparatus of the plurality of edge apparatuses includes a plurality of the shaping functions,
the network management apparatus further includes
a topology database configured to store section delays of sections connecting two edge apparatuses of the plurality of edge apparatuses,
a routing information database in which a path between terminals connected to the two edge apparatuses is registered as a flow, and a traffic control information database in which a relationship of the flow, the two edge apparatuses, and traffic control information is stored, and
the management function includes
a section data conversion unit configured to
collate the traffic control information included in the data and indicating which of the plurality of shaping functions the instantaneous throughput value uses with the traffic control information database and identify the flow,
collate the identified flow with the routing information database and acquire the path,
express the acquired path in combination with the sections,
copy the data with the number of the sections combined,
allocate each of the sections to the copied data and
calculate an arrival time point when the packet will arrive at each of the sections allocated to the copied data by adding up the section delays of the sections through which the packet passes to the sections, with reference to the section delays of the sections stored in the topology database, and
a sectionalized traffic amount estimation unit configured to add up throughput values of the data at an identical arrival time point for each of the sections and regard a sum of the throughput values as a sectionalized traffic amount.

5. A plurality of edge apparatuses connected to a network, each of the plurality of edge apparatuses comprising:
a non-transitory computer-readable medium having computer-executable instructions that, upon execution of the instructions by a processor of a computer, cause the computer to execute:
a shaping function configured to transfer a packet input from a user apparatus to the network using a token bucket algorithm,
a token supply amount control function configured to supply a token to the shaping function, and
a notification function configured to store the amount of tokens supplied by the token supply amount control function to the shaping function and notifying the network management apparatus of data including a time point and an instantaneous throughput value calculated from the total amount of tokens in every set notification cycle.

6. A network management apparatus connected to a plurality of edge apparatuses arranged in a network, the network management apparatus comprising:
a non-transitory computer-readable medium having computer-executable instructions that, upon execution of the instructions by a processor of a computer, cause the computer to execute:
an acquisition function configured to acquire data including a time point and an instantaneous throughput value calculated from the total amount of tokens in every predetermined notification cycle from each of the plurality of edge apparatus; and
a management function configured to add up instantaneous throughput values of all the data at an identical time point and regard a sum of the throughput values as an instantaneous traffic amount at the identical time point in the network,
wherein
each of the plurality of edge apparatuses comprises a non-transitory computer-readable medium having computer-executable instructions that, upon execution of the instructions by a processor of a computer, cause the computer to execute:
a shaping function configured to transfer a packet input from a user apparatus to the network using a token bucket algorithm,
a token supply amount control function configured to supply a token to the shaping function, and
a memory configured to store the amount of tokens supplied by the token supply amount control function to the shaping function.

\* \* \* \* \*